US011653309B2

(12) United States Patent
Zewail et al.

(10) Patent No.: US 11,653,309 B2
(45) Date of Patent: May 16, 2023

(54) POWER SCALING FOR DEMODULATION REFERENCE SIGNAL AND DATA TRANSMISSION

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Jing Sun, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/209,823

(22) Filed: Mar. 23, 2021

(65) Prior Publication Data

US 2022/0312333 A1 Sep. 29, 2022

(51) Int. Cl.
*H04W 72/02* (2009.01)
*H04W 52/14* (2009.01)
*H04W 52/18* (2009.01)

(52) U.S. Cl.
CPC ......... *H04W 52/146* (2013.01); *H04W 52/18* (2013.01)

(58) Field of Classification Search
CPC ..... H04W 72/04; H04W 80/08; H04W 52/16; H04W 72/02; H04W 16/02; H04J 13/18; H04J 13/00; H04J 11/00; H04L 27/34; H04L 27/18; H04L 27/04; H04L 27/36; H04B 7/04
See application file for complete search history.

(56) References Cited

U.S. PATENT DOCUMENTS

2018/0227912 A1 8/2018 Chen et al.
2019/0215849 A1 7/2019 Ye et al.
2019/0373551 A1 12/2019 Sundberg et al.
(Continued)

FOREIGN PATENT DOCUMENTS

WO WO-2020108654 A1 6/2020

OTHER PUBLICATIONS

Partial International Search Report—PCT/US2022/016327—ISA/EPO—dated May 31, 2022 (2102308WO).
(Continued)

*Primary Examiner* — Tu X Nguyen
(74) *Attorney, Agent, or Firm* — Holland & Hart LLP

(57) ABSTRACT

Methods, systems, and devices for wireless communications are described. A user equipment (UE) may receive control signaling which indicates a resource block indicating a number of reference signal tones and data tones in an uplink transmission. In some cases, the UE may determine a first transmission power for the reference signal tones, and a second transmission power for the data tones that is different from the first transmission power. In some other cases, the UE may identify a frequency allocation for the resource block which allocates a same frequency bandwidth for the reference signal tones and the data tones, and the UE may determine a same transmission power for the reference signal tones and the data tones based on the frequency allocation. Based on the determination of transmission powers, the UE may transmit the reference signal tones and the data tones to a base station.

17 Claims, 16 Drawing Sheets

(56) References Cited

U.S. PATENT DOCUMENTS

2020/0007293 A1\* 1/2020 Wei ....................... H04L 5/0051
2021/0289561 A1 9/2021 Liu et al.

OTHER PUBLICATIONS

International Search Report and Written Opinion—PCT/US2022/016327—ISA/EPO—dated Aug. 23, 2022 (2102308WO).
Moderator (China Telecom): "[104-e-NR-CovEnh-03] Summary of email Discussion on Joint Channel Estimation for PUSCH", 3GPP Draft, R1-2102161, 3GPP TSG RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, No. E-Meeting, Jan. 25, 2021-Feb. 5, 2021, Feb. 8, 2021 (Feb. 8, 2021), XP051977732, 92 Pages, paragraph [02.3] paragraph [03.2].

\* cited by examiner

POWER SCALING FOR DEMODULATION REFERENCE SIGNAL AND DATA TRANSMISSION

FIELD OF TECHNOLOGY

The following relates to wireless communications, including power scaling for demodulation reference signal (DMRS) and data transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless devices may communicate using high frequencies such as those allocated to an unlicensed frequency spectrum band. Conventional techniques for transmitting data and reference signaling on such bands, however, may be deficient.

SUMMARY

The described techniques relate to improved methods, systems, devices, and apparatuses that support power scaling for demodulation reference signal and data transmission. Generally, the described techniques provide for improved uplink transmission of reference signaling and data. In some wireless communications networks, a wireless device such as a user equipment (UE) may transmit uplink signals in accordance with various power requirements of a high frequency (e.g., unlicensed) band. A network device such as a base station may allocate uplink resources using a resource block configuration for the UE to use for transmissions of reference signaling (e.g., a demodulation reference signal (DMRS)) and uplink data. Based on a configuration type of the DMRS (e.g., DMRS configuration Type 1 or DMRS configuration Type 2), the DMRS tones may be transmitted over a specific set of resource elements (REs) of the resource block.

In some cases, however, based on the DMRS type and the various transmission power requirements of the high frequency band, data tones may be transmitted at full power while the DMRS tones are not able to achieve full power. Accordingly, the UE implement a number of different techniques to efficiently transmit the DMRS and data. For example, in some cases, the UE may transmit the DMRS using a first transmission power, and the data using a second transmission power that is different from the first transmission power. In such cases, the UE may transmit the data at full power even if the DMRS is transmitted at a lesser power. In some other examples, the UE may allocate the DMRS tones and data tones to the same frequency indices of a resource block such that the frequency bandwidth of the DMRS tones is equal to the data tones.

A method for wireless communications at a user equipment (UE) is described. The method may include receiving, from a base station, control signaling identifying a resource block configuration that indicates a set of multiple reference signal tones and a set of multiple data tones allocated for transmission in an uplink resource block, determining a first transmission power for the set of multiple reference signal tones and a second transmission power for the set of multiple data tones based on the resource block configuration, where the first transmission power is different from the second transmission power, and transmitting, to the base station, the set of multiple reference signal tones using the first transmission power and the set of multiple data tones using the second transmission power.

An apparatus for wireless communications at a UE is described. The apparatus may include a processor, memory coupled with the processor, and instructions stored in the memory. The instructions may be executable by the processor to cause the apparatus to receive, from a base station, control signaling identifying a resource block configuration that indicates a set of multiple reference signal tones and a set of multiple data tones allocated for transmission in an uplink resource block, determine a first transmission power for the set of multiple reference signal tones and a second transmission power for the set of multiple data tones based on the resource block configuration, where the first transmission power is different from the second transmission power, and transmit, to the base station, the set of multiple reference signal tones using the first transmission power and the set of multiple data tones using the second transmission power.

Another apparatus for wireless communications at a UE is described. The apparatus may include means for receiving, from a base station, control signaling identifying a resource block configuration that indicates a set of multiple reference signal tones and a set of multiple data tones allocated for transmission in an uplink resource block, means for determining a first transmission power for the set of multiple reference signal tones and a second transmission power for the set of multiple data tones based on the resource block configuration, where the first transmission power is different from the second transmission power, and means for transmitting, to the base station, the set of multiple reference signal tones using the first transmission power and the set of multiple data tones using the second transmission power.

A non-transitory computer-readable medium storing code for wireless communications at a UE is described. The code may include instructions executable by a processor to receive, from a base station, control signaling identifying a resource block configuration that indicates a set of multiple reference signal tones and a set of multiple data tones allocated for transmission in an uplink resource block, determine a first transmission power for the set of multiple reference signal tones and a second transmission power for the set of multiple data tones based on the resource block configuration, where the first transmission power is different from the second transmission power, and transmit, to the base station, the set of multiple reference signal tones using the first transmission power and the set of multiple data tones using the second transmission power.

Some examples of the method, apparatuses, and non-transitory computer-readable medium described herein may further include operations, features, means, or instructions for transmitting, to the base station, an indication of the first transmission power for the set of multiple reference signal tones being different from the second transmission power for the set of multiple data tones.

In some examples of the method, apparatuses, and non-transitory computer-readable medium described herein, the indication includes a ratio for the first transmission power and the second transmission power.

Some examples of the method, apparatuses, and non-transitory computer-readable medium described herein may further include operations, features, means, or instructions for transmitting the indication via an uplink control channel report, a radio resource control message, a medium access control-control element, or any combination thereof.

Some examples of the method, apparatuses, and non-transitory computer-readable medium described herein may further include operations, features, means, or instructions for transmitting, to the base station, a message indicating a capability of the UE to maintain a phase continuity between transmissions of the set of multiple reference signal tones using the first transmission power and transmissions of the set of multiple data tones using the second transmission power.

Some examples of the method, apparatuses, and non-transitory computer-readable medium described herein may further include operations, features, means, or instructions for identifying a set of transmission power values in accordance with the resource block configuration, a subcarrier spacing of the uplink resource block, or both and selecting the first transmission power and the second transmission power from the set of transmission power values based on the identifying.

In some examples of the method, apparatuses, and non-transitory computer-readable medium described herein, the resource block configuration indicates a threshold power for transmission of the uplink resource block, a bandwidth available for transmission of the uplink resource block, a configuration type for the set of multiple reference signal tones, or any combination thereof.

Some examples of the method, apparatuses, and non-transitory computer-readable medium described herein may further include operations, features, means, or instructions for determining the first transmission power for the set of multiple reference signal tones and the second transmission power for the set of multiple data tones may be based on a transmission power ratio.

In some examples of the method, apparatuses, and non-transitory computer-readable medium described herein, the transmission power ratio may be based on the resource block configuration.

A method for wireless communications at a UE is described. The method may include receiving, from a base station, control signaling identifying a resource block configuration that indicates a frequency allocation for transmission of a set of multiple reference signal tones and a set of multiple data tones in an uplink resource block, determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation, and transmitting, to the base station, the set of multiple reference signal tones and the set of multiple data tones based on the frequency allocation using the determined transmission power.

An apparatus for wireless communications at a UE is described. The apparatus may include a processor, memory coupled with the processor, and instructions stored in the memory. The instructions may be executable by the processor to cause the apparatus to receive, from a base station, control signaling identifying a resource block configuration that indicates a frequency allocation for transmission of a set of multiple reference signal tones and a set of multiple data tones in an uplink resource block, determine a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation, and transmit, to the base station, the set of multiple reference signal tones and the set of multiple data tones based on the frequency allocation using the determined transmission power.

Another apparatus for wireless communications at a UE is described. The apparatus may include means for receiving, from a base station, control signaling identifying a resource block configuration that indicates a frequency allocation for transmission of a set of multiple reference signal tones and a set of multiple data tones in an uplink resource block, means for determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation, and means for transmitting, to the base station, the set of multiple reference signal tones and the set of multiple data tones based on the frequency allocation using the determined transmission power.

A non-transitory computer-readable medium storing code for wireless communications at a UE is described. The code may include instructions executable by a processor to receive, from a base station, control signaling identifying a resource block configuration that indicates a frequency allocation for transmission of a set of multiple reference signal tones and a set of multiple data tones in an uplink resource block, determine a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation, and transmit, to the base station, the set of multiple reference signal tones and the set of multiple data tones based on the frequency allocation using the determined transmission power.

Some examples of the method, apparatuses, and non-transitory computer-readable medium described herein may further include operations, features, means, or instructions for transmitting, to the base station, an indication of the frequency allocation for transmission of the set of multiple reference signal tones and the set of multiple data tones on one or more same frequency indices.

In some examples of the method, apparatuses, and non-transitory computer-readable medium described herein, the set of multiple reference signal tones and the set of multiple data tones may be located on frequency indices that may be interlaced across a bandwidth associated with transmission of the uplink resource block.

In some examples of the method, apparatuses, and non-transitory computer-readable medium described herein, the set of multiple reference signal tones and the set of multiple data tones may be located on alternating frequency indices of the uplink resource block based on a configuration type for the set of multiple reference signal tones.

In some examples of the method, apparatuses, and non-transitory computer-readable medium described herein, the set of multiple reference signal tones and the set of multiple data tones may be located on a number of contiguous frequency indices of the uplink resource block based on a configuration type for the set of multiple reference signal tones.

In some examples of the method, apparatuses, and non-transitory computer-readable medium described herein, the resource block configuration indicates a threshold power for transmission of the uplink resource block, a bandwidth available for transmission of the uplink resource block, a configuration type for the set of multiple reference signal tones, or any combination thereof.

In some examples of the method, apparatuses, and non-transitory computer-readable medium described herein, the frequency allocation may be associated with a cyclic prefix (CP) orthogonal frequency division multiplexing (OFDM) configuration for the set of multiple reference signal tones and the set of multiple data tones.

DETAILED DESCRIPTION

Figure 1:
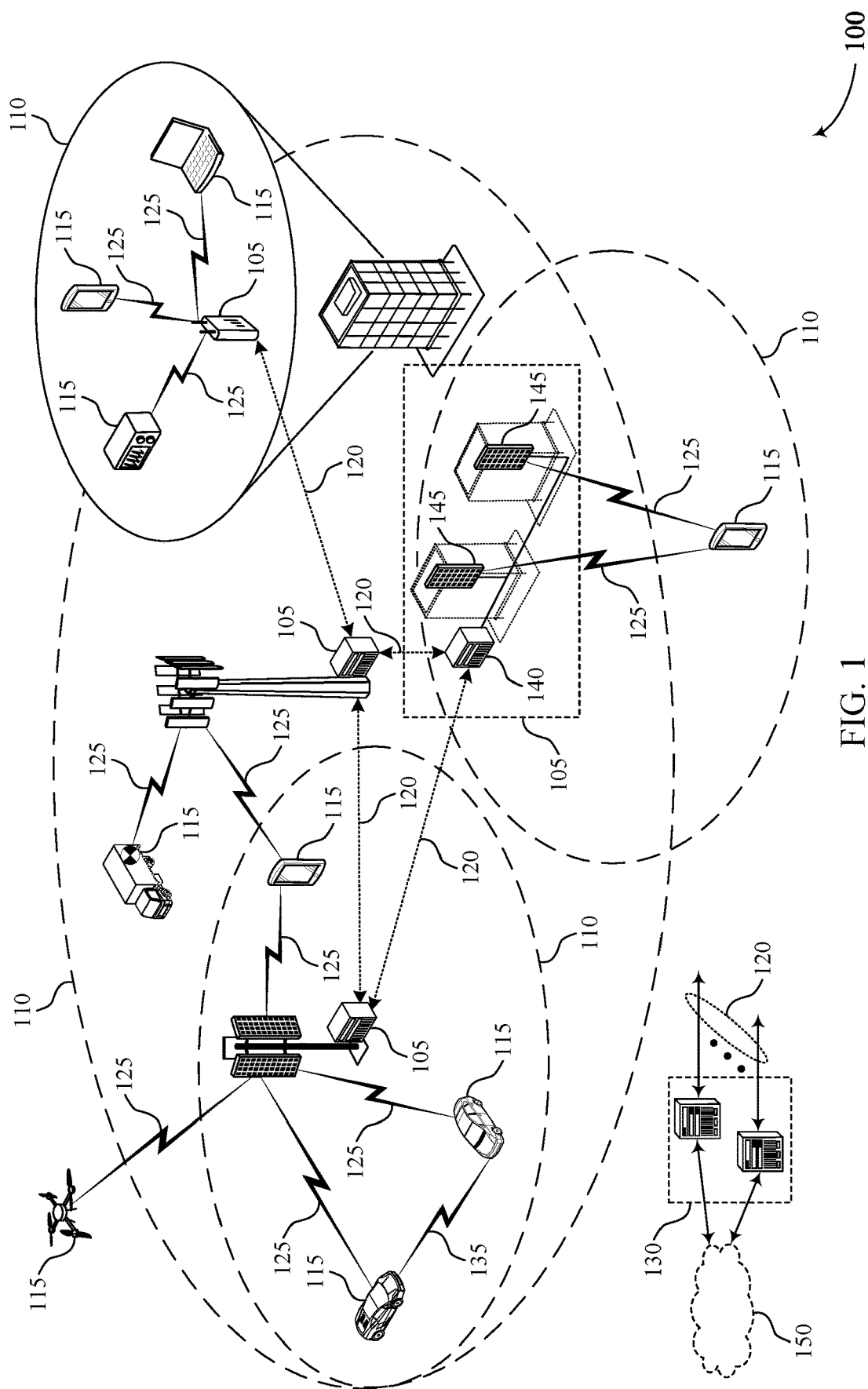
FIG. 1 illustrates an example of a wireless communications system that supports power scaling for demodulation reference signal (DMRS) and data transmission in accordance with aspects of the present disclosure.

In some wireless communications systems, a wireless device such as a user equipment (UE) may communicate with a base station using relatively high frequencies such as those allocated to an unlicensed frequency spectrum band. In cases where a UE communicates with the base station in such high frequency bands (e.g., 60 GHz band), the UE may be limited by various power regulatory requirements. Such power limitations (such as limitations on power spectral density (PSD)) may reduce the bandwidth available for the device to transmit a demodulation reference signal (DMRS) and data in the uplink.

In some examples, a base station may allocate a resource block (RB) to the UE, and the UE may use the resource block for subsequent uplink transmissions of DMRS and data. Based on a configuration type of the DMRS (e.g., DMRS configuration Type 1 or DMRS configuration Type 2), the DMRS tones may be transmitted over a specific set of resource elements (REs) of the resource block. For example, if the base station indicates use of DMRS configuration Type 1, the UE may alternate the placement of DMRS tones and data tones to every other RE in a frequency domain of the resource block. Additionally or alternatively, if the base station indicates use of DMRS configuration Type 2, the UE may allocate DMRS to contiguous resource elements of the resource block.

In some cases, the placement of DMRS and data may affect the usable bandwidth and associated transmission powers allocated for the uplink transmissions. For example, for DMRS Type 1, half of the total bandwidth may be used for transmitting the DMRS tones, while the data tones carried on a physical uplink shared channel (PUSCH) may have no such limitation on which REs they can reside in. Therefore, the data tones may fill REs over the entire bandwidth of the RB. Since the data tones may span the entire bandwidth, the data tones may be transmitted at full power while the DMRS tones are not able to achieve full power. Accordingly, the UE may reduce the transmission power of the data tones to accommodate the lower transmission power of the DMRS tones to retain a 1:1 transmission power traffic to pilot ratio. In such cases, the power that the UE uses to transmit the data may be the same as the power used to transmit the DMRS, which may result in a reduction in coverage, inefficient power expenditure, and an overall unsatisfactory user experience.

To address the differences in transmission powers between DMRS and data symbols in the uplink, the UE may determine to transmit the DMRS and the data using a traffic to pilot ratio that is different than 1:1. For example, the UE may determine one or more data tones may be transmitted at a higher power than one or more DMRS tones, and the UE may adjust the transmission power ratio between the DMRS and the data in order to accommodate the different transmission powers. In some cases, the updated traffic to pilot ratio may be transmitted from the UE to the base station, and the base station may acknowledge the change in expected transmission powers.

In accordance with some other techniques, the UE may allocate the DMRS tones and data tones to the same frequency indices of a resource block such that the frequency bandwidth of the DMRS tones is equal to the data tones. Accordingly, the UE may transmit the DMRS tones and data tones at the same transmission power without a reduction in coverage.

Particular aspects of the subject matter described herein may be implemented to realize one or more advantages. The described techniques may support improvements in techniques for wireless devices to transmit uplink DMRS and data in high frequency bands, such as an unlicensed band. In some examples, the techniques may allow for additional techniques to increase data throughput and coverage for uplink transmissions of DMRS and data.

Aspects of the disclosure are initially described in the context of wireless communications systems. Aspects of the disclosure are further illustrated by and described with reference to apparatus diagrams, system diagrams, resource block configurations, process flows, and flowcharts that relate to power scaling for demodulation reference signal and data transmission.

FIG. 1 illustrates an example of a wireless communications system 100 that supports power scaling for demodulation reference signal and data transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, UE 115 may communicate with a base station 105 using relatively high frequencies such as those of an unlicensed frequency spectrum band. In cases where a UE 115 communicates with the base station in such high frequency bands (e.g., 60 GHz band), the UE 115 may be limited by various power regulatory requirements such as power spectral density (PSD) limitations. Such regulations may effectively reduce the usable bandwidth available for the UE 115 to transmit uplink DMRS and data.

A base station 105 may allocate resource block to the UE 115 for subsequent uplink transmissions of DMRS and data. Based on a configuration type of the DMRS (e.g., DMRS configuration Type 1 or DMRS configuration Type 2), the DMRS tones may be transmitted over a specific set of REs of the resource block. For example, if the base station 105 indicates use of DMRS configuration Type 1, the UE 115 may alternate the placement of DMRS tones and data tones to every other RE in the resource block. Additionally or alternatively, if the base station indicates use of DMRS configuration Type 2, the UE may allocate DMRS to contiguous resource elements of the resource block.

In some cases, based on the DMRS type and various transmission power regulatory requirements, data tones may be transmitted at full power while the DMRS tones are not able to achieve full power. Accordingly, the UE 115 may reduce the transmission power of the data tones to accommodate the lower transmission power of the DMRS tones, resulting in a reduction in coverage.

To increase efficiency of transmission between DMRS and data symbols in the uplink, the UE 115 may implement a number of different techniques. For example, in some cases, the UE 115 may transmit the DMRS and the data using a traffic to pilot ratio that is different than 1:1. For example, the UE 115 may transmit the data tones using full power and DMRS using less power. In some other examples, the UE 115 may allocate the DMRS tones and data tones to the same frequency indices of a resource block such that the frequency bandwidth of the DMRS tones is equal to the data tones. Accordingly, the UE 115 may transmit the DMRS tones and data tones at the same transmission power without a reduction in coverage.

Figure 2:
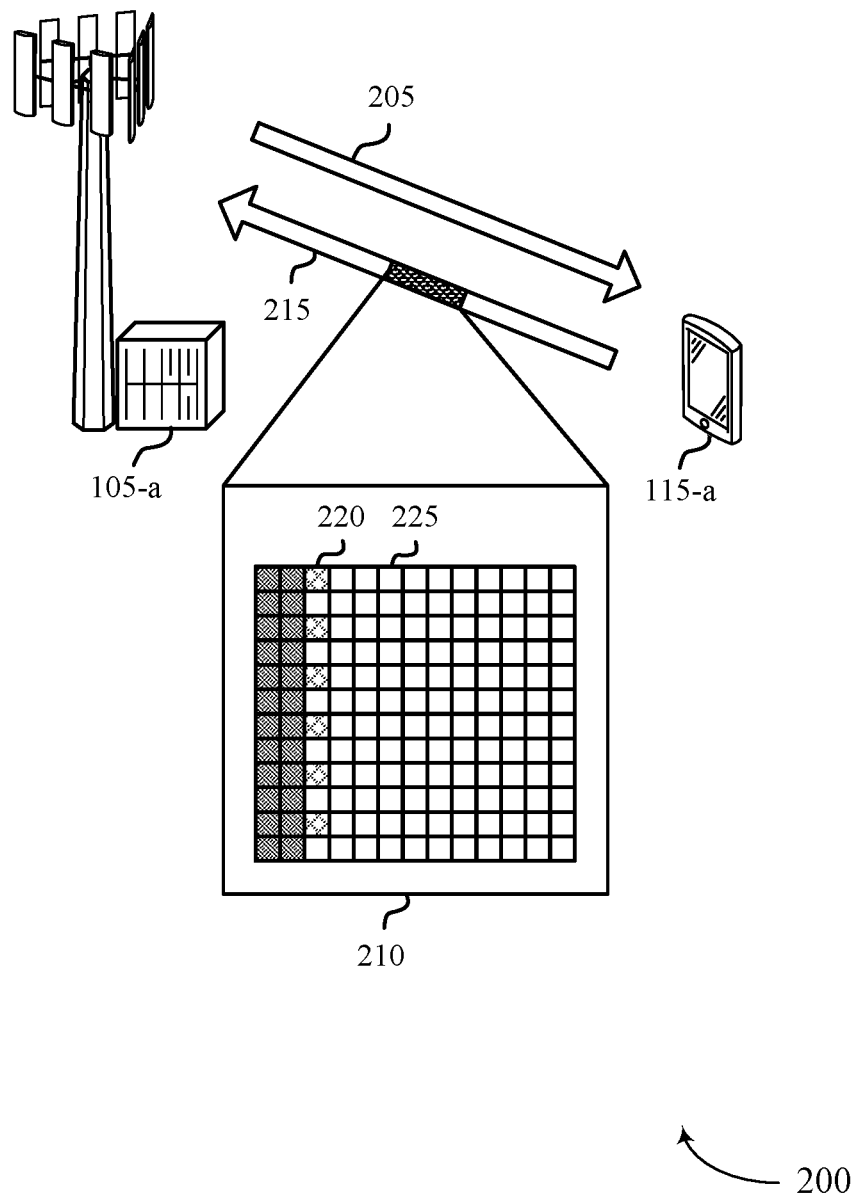
FIG. 2 illustrates an example of a wireless communications system that supports power scaling for DMRS and data transmission in accordance with aspects of the present disclosure.

FIG. 2 illustrates an example of a wireless communications system 200 that supports power scaling for DMRS and data transmission in accordance with aspects of the present disclosure. The wireless communications system 200 may implement aspects of wireless communications system 100. For example, wireless communications system 200 may illustrate communications between a UE 115-a and a base station 105-a, which may be examples of a UE 115 and base station 105 described with reference to FIG. 1. In some examples, the UE 115-a may be configured to transmit both DMRS and data to a base station using techniques that effectively enhance data throughput and coverage, as described herein. While wireless communications system 200 shows communication between a single base station 105-a and a single UE 115-a, it should be understood that these communications may occur between any number of network devices.

In some examples, the UE 115-a may communicate with a base station 105-a using relatively high frequencies (e.g., 60 GHz) such as those allocated to an unlicensed frequency spectrum band. In some cases, communications within an unlicensed band may comply with various power restrictions or requirements. Such power restrictions may include a PSD limit (e.g., an amount of power as a function of frequency, or the energy of a transmitted signal over time). For example, a 60 GHz frequency band may have an associated PSD of 23 decibel-milliwatts (dBm) per MHz (dBm/MHz) with an effective isotropic radiated power (EIRP) of 40 dBm. In some examples, to utilize the power capabilities for high EIRP devices in wireless communications system 200, the UE 115-a may operate using a 50 MHz transmission bandwidth to achieve an EIRP of 40 dBm under the 23 dBm/MHz limitation.

During communications with the UE 115-a, the base station 105-a may allocate a resource block 210 or a set of resource blocks to the UE 115-a using a resource block configuration or a resource block allocation, and the UE 115-a may use the allocated uplink resources of the resource block 210 for subsequent uplink transmissions 215 to the base station 105-b. For example, the UE 115-a may transmit a number of uplink reference signal tones 220 (e.g., DMRS tones 220) and data tones 225 to the base station 105-b using the resource block 210. In some examples, the resource block 210 may contain 12 sub-carriers in a frequency domain (e.g., indexed 0 to 11) in which the UE 115-a may allocate reference signal tones 220 and data tones 225.

The UE 115-a may receive control signaling 205 from the base station 105-a which may indicate the allocated resource block 210 or set of resource blocks that the UE 115-a may use for an uplink transmission 215. The UE 115-a may allocate the reference signal tones 220 and data tones 225 to a specific set of REs of the resource block 210 based on the configuration type of the DMRS (e.g., DMRS configuration Type 1 or DMRS configuration Type 2). For example, in cases where the base station 105-a indicates the use of DMRS configuration Type 1, the UE 115-a may allocate reference signal tones 220 to REs in every other frequency sub-carrier of the resource block 210. In other cases where the base station 105-a indicates the use of DMRS configuration Type 2, the UE 115-a may allocate the reference signal tones 220 with a pattern of two reference signal tones 220 allocated to consecutive frequency sub-carriers (e.g., sub-carrier index 0 and index 1) with four empty sub-carriers following after consecutive sub-carriers (e.g., sub-carrier indices 2-5).

Based on the configuration type of the DMRS, the UE 115-a may use different portions of the total bandwidth for transmitting reference signal (e.g., DMRS) tones 220. For example, according to DMRS type 1, the UE 115-a may allocate half of the bandwidth for transmission of the DMRS tones 220. Additionally or alternatively, the UE 115-a may allocate data tones 225 (carried on a PUSCH) to REs spanning the entire bandwidth of the resource block 210. Based on power limitations of the high frequency band, and in accordance with the associated resource block allocation (e.g., 50 MHz resource block allocation, which may be small relative to other resource block allocations), the UE 115-b may transmit the data tones 225 with full power, while the DMRS tones 220 may not be able to achieve a full power level. In such cases, the UE 115-a may limit the transmission power of the data tones 225 to correspond to the transmission power of the DMRS tones 220, despite the higher transmission power capabilities of the UE 115-a. For example, in some cases, the UE 115-a may transmit both the DMRS tones 220 and the data tones 225 using the same transmission power based on various system factors and to maintain phase continuity between the different tone types.

To increase coverage and data throughput for uplink DMRS and data, and to effectively account for differences in transmission powers between the reference signal tones 220 and data tones 225, the UE 115-a may implement a number of different techniques. In some examples, the UE 115-a may determine to transmit the data tones 225 at a different transmission power than the DMRS tones 220 (e.g., the UE 115-a may transmit the different tone types at different transmission powers). For example, the UE 115-a may determine that a set of data tones may be transmitted at a higher power than a corresponding set of reference signal tones, and may thus change the transmission powers of the data tones and the references signal tones accordingly. In some cases, changing the transmission powers of the reference signal tones and the data tones may include changing a transmission power ratio between DMRS transmission power and data transmission power (e.g., the traffic to pilot ratio) to a ratio different from 1:1. For example, the UE 115-a may adjust the traffic to pilot ratio to be 1:2 in order to transmit the data tones at twice the power of the corresponding DMRS tones.

In some cases, the UE 115-a may transmit an indication of the traffic to pilot ratio to the base station 105-a. The base station 105-a may acknowledge the traffic to pilot ratio, and may expect a first transmission power for the reference signal tones 220 and a second, different transmission power for the data tones 225 based on the traffic to pilot ratio. In such cases, the UE 115-a may dynamically update the traffic to pilot ratio based on the resource block allocation, system conditions, or data payload. Additionally or alternatively, the UE 115-a may be configured with a set of possible traffic to pilot ratios (e.g., using reference table), and the UE 115-a may select a traffic to pilot ratio based on various conditions such as sub-carrier spacing (SCS) of the resource block 210, the number of contiguous resource blocks scheduled for the transmission, or a combination thereof. Based on applying the traffic to pilot ratio, the UE 115-a may transmit the uplink transmission 215, which includes the reference signal tones 220 transmitted at a first power, and data tones 225 transmitted at a second, different power.

In some examples, the UE 115-a may determine that it is unable to maintain phase continuity between DMRS and data symbols if they are transmitted at different powers (e.g., in accordance with a different traffic to pilot ratio). In such examples, the UE 115-a may maintain phase continuity rather than proceeding with an updated traffic to pilot ratio if no phase tracking reference signals (PTRS) are transmitted with the DRMS and data. In some other cases, the UE 115-a may proceed to transmit the DMRS and data at different transmit powers in accordance with the updated traffic to pilot ratio even if the UE 115-a is unable to maintain phase continuity. For example, the UE 115-a may transmit the DMRS and data with a number of PTRS signals to account for phase error or phase discontinuity between the DMRS and the data. In such cases, the base station 105-a may use the transmitted PTRS signals to correct the difference in phase between the DMRS and the data. The UE 115-a may identify a phase continuity capability (e.g., maintaining the same phase for symbols with different powers), and may transmit an indication of this capability along with the indication of the updated traffic to pilot ratio to the base station 105-a. In addition, the UE 115-a may transmit an indication that the phase is changed to the base station 105-a. Based on receiving the capability and the indication that the phase is changed, the base station 105-a may determine to correct phase discontinuity between the DMRS and data tones it receives from the UE 115-a.

In accordance with some other techniques, the UE 115-a may receive an indication of a transmission structure via a resource block allocation from the base station 105-a that it may use to transmit the reference signal tones 220 and data tones 225. In such cases, the UE 115-a may allocate the reference signal tones 220 and data tones 225 to the one or more resource blocks in accordance with a "comb structure" for the resource block, such that the frequency bandwidth of the reference signal tones 220 is equal to the frequency bandwidth of the data tones 225, and are allocated to every other resource element of the resource block. In some cases, the UE 115-a may allocate the data tones 225 in the same pattern that it allocates the reference signal tones 220, or the UE 115-a may allocate the data tones 225 to the same frequency indices as the DMRS tones. Based on resource block allocation, one or more additional UEs may utilize the frequency resources of the resource block that are not allocated for the DMRS and data tones (e.g., the base station 105-a may multiplex multiple UEs on the same resource block having a comb structure for the transmission of DMRS and data).

For example, if the base station 105-a indicates a DMRS configuration Type 1, the base station 105-a may transmit a resource block allocation to the UE 115-a that indicates how the UE 115-a may allocate both the data tones 225 and the DMRS tones 220 to every other frequency sub-carrier, as described with reference to FIG. 4A. If the base station 105-a indicates a DMRS configuration Type 2, the UE 115-a may allocate the data tones 225 and the DMRS tones 220 to the same frequency sub-carriers, as described in reference to FIG. 4B. By allocating the reference signal tones 220 and data tones 225 to the same frequency sub-carriers, the UE 115-a may transmit the reference signal tones 220 and data tones 225 at the same transmission power without a reduction in coverage.

Figure 3:
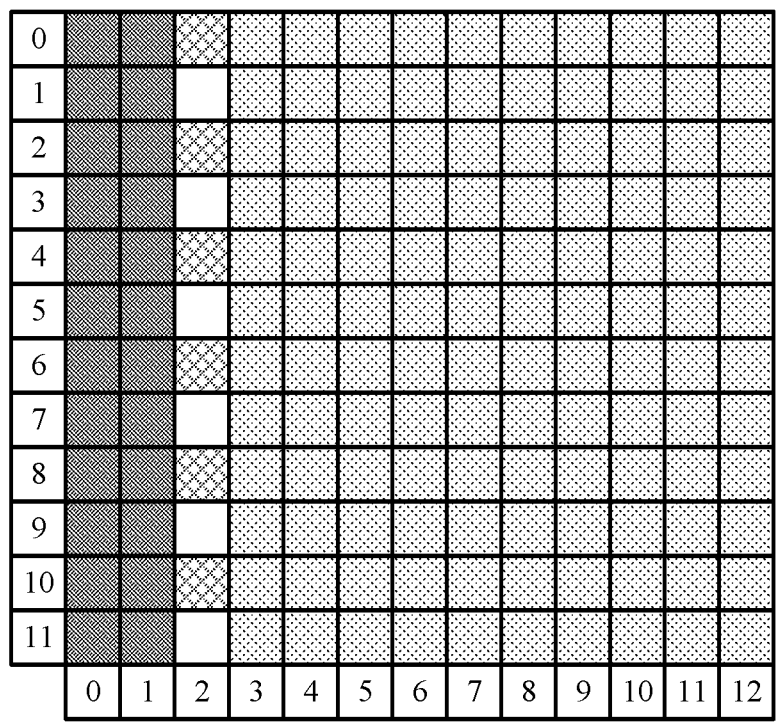
FIGS. 3, 4A, and 4B illustrate example resource block configurations that support power scaling for DMRS and data transmission in accordance with aspects of the present disclosure.
Figure 3:
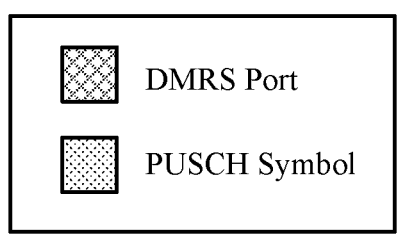

FIG. 3 illustrates an example of a resource block configuration 300 that supports power scaling for DMRS and data transmission in accordance with aspects of the present disclosure. For example, a UE may use the resource block configuration 300 to transmit uplink reference signals and data (using a number of reference signal tones and data tones of the resource block, respectively) to a base station. In some examples, the resource block configuration 300 may be implemented to support aspects of wireless communications system 100 or wireless communication system 200. For example, a base station 105 may allocate a set of uplink resources to a UE 115 using the resource block illustrated in resource block configuration 300, and the UE 115 may configure one or more subsequent uplink (UL) transmissions of DMRS and data (e.g., PUSCH data) to the base station 105.

In some examples, the resource block configuration 300 may be represented by a grid of frequency resources (on the vertical axes) and time resources (on the horizontal axes) used for data transmission. The resource grid may include a number of smaller REs which are the smallest unit of the resource grid that the UE may use for transmission of DMRS or data. For example, an RE may include of one subcarrier in the frequency domain and one OFDM symbol in the time domain. In some cases, the resource block may contain 12 sub-carriers in a frequency domain (e.g., sub-carriers 0 through 11) that the UE may use to transmit DMRS and data to the base station 105. In some examples, the channel width allocated for use by the UE 115 may be dependent on the sub-carrier spacing (SCS) (e.g., the frequency spacing between each sub-carrier). In some cases, for example, the SCS for resource block configuration 300 may be 960 kHz, and the total channel width may be the SCS multiplied by the number of sub-carriers in the resource block (e.g., 11.52 MHz). The resource block, with the predefined SCS, may be allocated to the UE 115 for subsequent uplink transmissions to the base station 105.

In some examples, the UE 115 may use the uplink resources of the resource block configuration 300 to transmit a number of DMRS tones, data tones, or a combination thereof. In some cases, the UE 115 may determine a configuration type of the DMRS (e.g., DMRS configuration Type 1 or DMRS configuration Type 2), which may define which REs of the resource block configuration 300 the UE 115 may use for transmission of the DMRS. For example, the resource block configuration 300 may implement DMRS configuration Type 1, and the UE 115 may alternate the placement of DMRS tones and data tones over every other RE such that half of the bandwidth may be allocated for transmission of the DMRS. In addition, the UE may populate the entire width of the frequency band with data tones, as shown in resource block Configuration 300.

In some cases, the UE 115 may be operating in a higher band (e.g., 60 GHz), which may subject the UE 115 to a number of transmission power regulations. For example, the UE 115 may operate according to PSD and EIRP targets which may effectively limit the total bandwidth allocated for transmission of the resource block. For example, the resource block configuration 300 may be a small resource block allocation (e.g., relative to resource block allocations without such power limitations, resource block allocations in a lower band, etc.), and the UE 115 may allocate a first half of the bandwidth to transmission of the DMRS and a second half of the bandwidth to transmission of the data.

To support efficient transmission of DMRS and data using the resource block configuration 300, in some examples, the UE 115 may transmit the DMRS at a different power than the data (e.g., the UE 115 may transmit DMRS and data at different maximum powers). In such examples, the UE 115 may change a transmission power ratio for the DMRS and the data (e.g., the traffic to pilot ratio) from 1:1 (e.g., where the DMRS and the data are transmitted using equal transmission power) to some other ratio (e.g., 1:2). For example, the UE 115 may determine that one or more data tones may be transmitted at a higher power than one or more corresponding DMRS tones, and the UE 115 may adjust the traffic to pilot ratio to represent the difference in transmission powers for the data and the DMRS.

In some cases, the UE 115 may determine the transmission power ratio for the DMRS and the data using a number of different techniques. In some examples, the UE 115 may be pre-configured with a set of traffic to pilot ratios (e.g., the UE 115 may look up different traffic to pilot ratios using a reference table) which may be associated with the SCS and the number of resource blocks allocated by the base station 105 for uplink transmission by the UE 115. For instance, an example reference table may be given by Table 1:

TABLE 1

Scaling Factor for DRMS and Data

| Contiguous Scheduled BW | Scaling Factor (DMRS power/PUSCH power) |
|---|---|
| $N_{RB} < 8$ | 1/2 |
| $N_{RB} > 8$ | 1 |

In some examples, Table 1 may illustrate possible DMRS to data transmission power ratios in which the SCS is 960 kHz, although the DMRS to data transmission power ratios may not be limited to those included in Table 1. For example, the UE 115 may determine a traffic to pilot ratio of 1:2 when the number of resource blocks ($N_{RB}$) allocated is greater than 8 and a ratio of 1:1 if the number of resource blocks ($N_{RB}$) allocated is less than 8. Additionally, or alternatively, the UE 115 may dynamically update the traffic to pilot ratio depending on various transmission parameters or system parameters, or based on signaling received from the base station 105. These parameters may include, but are not limited to, resource allocation for transmission, system conditions (e.g., weather, physical barriers, signal strength, etc.), the size of the data payload, or a combination thereof. In some other examples, a UE operating in a lower frequency band with a lower PSD limit, may maintain a 1:1 traffic to pilot ratio.

Upon determining an updated traffic to pilot ratio for a subsequent resource block transmission, the UE 115 may transmit an indication of the traffic to pilot to the base station 105. In some examples, the UE 115 may transmit the indication via a report on a physical uplink control channel (PUCCH), using an RRC message or a MAC control element (MAC-CE), or a combination thereof. In some examples, the base station 105 may receive the indication of the traffic to pilot ratio from the UE 115. Based on the indication, the base station may identify one or more different power levels that the UE 115 may use for subsequent transmissions of the DMRS tones and data tones. For example, the base station 105 may receive an indication of a traffic to pilot ratio of 1:2, indicating that the UE 115 may transmit the data tones at twice the power level of the DMRS tones during the uplink transmission. Upon transmission of the indication of the traffic to pilot ratio, the UE 115 may transmit the resource block configuration 300 to base station 105 in accordance with the indicated traffic to pilot ratio. The base station 105 may receive the DMRS signals and data transmitted over the allocated resource blocks.

In some cases, changes to the traffic to pilot ratio may impact a capability of the UE 115 to maintain phase continuity between transmissions of the DMRS and data tones. For example, in some cases, the UE 115 may be unable to maintain phase continuity between DMRS and data tones transmitted at different powers (e.g., with a traffic to pilot ratio that is different than 1:1). In such cases, the UE 115 may prioritize preserving phase continuity during uplink transmission rather than proceeding with an updated traffic to pilot ratio if no PTRS signals are transmitted. In some other cases, the UE 115 may transmit the data tones and DMRS with different powers if the PTRS signals are transmitted. For example, the UE 115-a may proceed to transmit the DMRS and data at different transmit powers in accordance with the updated traffic to pilot ratio even if the UE 115 is unable to maintain phase continuity between the DMRS and the data tones. The UE 115 may transmit the DMRS and data with a number of PTRS signals to account for phase error or phase discontinuity between the DMRS and the data, and the base station 105 may use the transmitted PTRS signals to correct the difference in phase between the DMRS and the data. In some other examples, however, the UE 115 may be capable of maintaining phase continuity between the DMRS and data tones transmitting at different power levels. The UE 115 may transmit an indication of a phase continuity capability (e.g., a capability to maintain phase), and may transmit an indication of this capability (or a lack of such capability) along with the indication of the updated traffic to pilot ratio to the base station 105.

Figure 4A:
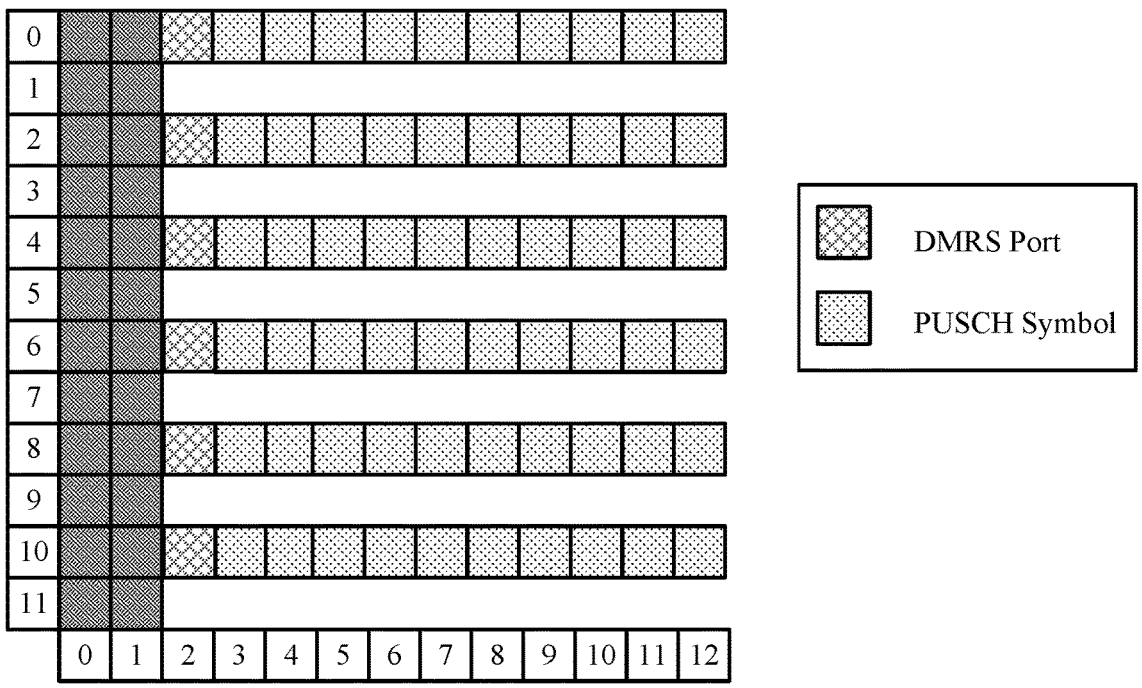
Figure 4B:
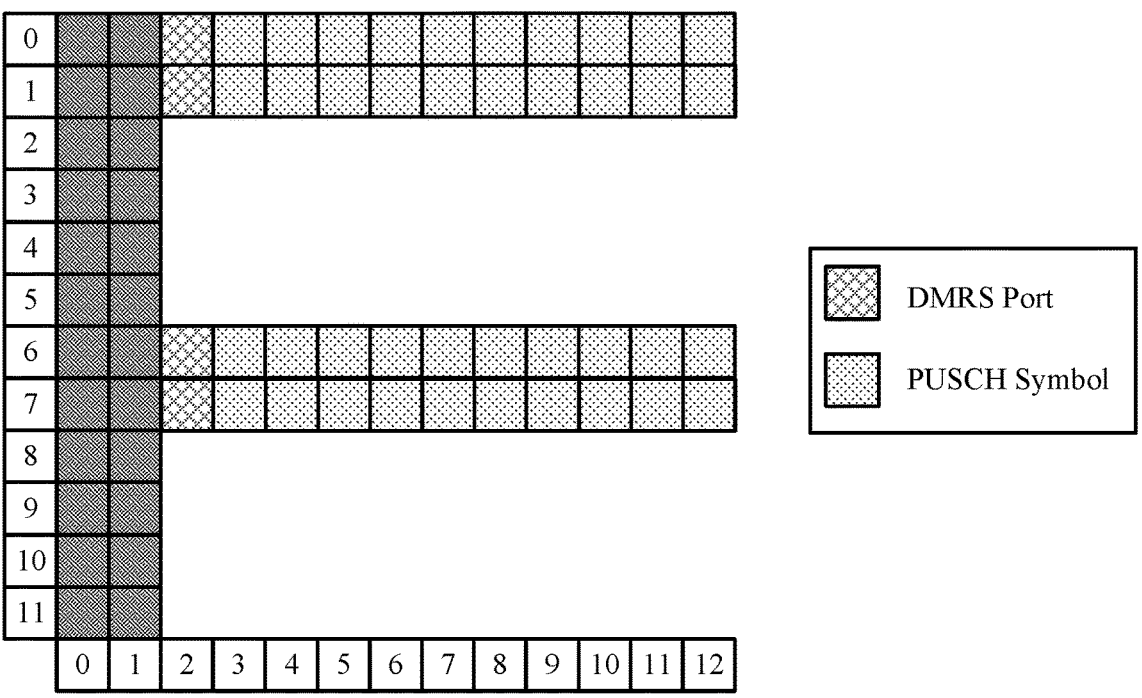

FIGS. 4A and 4B illustrate examples of resource block configurations 400-a and 400-b that support power scaling for DMRS and data transmission in accordance with aspects of the present disclosure. For example, a UE 115 may use the resource block configurations 400-a and 400-b to transmit a number of uplink reference signals and data to a base station. In some examples, the resource block configurations 400-a and 400-b may be implemented to support aspects of wireless communications system 100 and 200. For example, a base station 105 may allocate a set of uplink resources to the UE 115 using a resource block configuration, and the UE 115 may configure one or more subsequent uplink (UL) transmissions of DMRS and data (e.g., PUSCH data) to the base station 105 using the configured resource block.

In some examples, the resource block configurations 400-a and 400-b may be represented by a grid of frequency resources (on the vertical axes) and time resources (on the horizontal axes) used for data transmission. The resource grid may include a number of smaller REs that the UE may use for transmission of DMRS or data. In some cases, a resource block may contain 12 sub-carriers in a frequency domain (e.g., sub-carriers 0 through 11) that the UE 115 may use to transmit DMRS and data to the base station 105.

In some examples, the UE 115 may use the uplink resources of the resource block configuration 300 to transmit a number of DMRS tones, data tones, or a combination thereof. The UE 115 may receive a resource block allocation from the base station 105 which indicates the uplink resources that the UE 115 may use for transmission of the DMRS and data. In some cases, the UE 115 may determine, via the resource block allocation, a configuration type of the DMRS (e.g., DMRS configuration Type 1 or DMRS configuration Type 2), which may define which REs of the resource block configurations 400-a and 400-b the UE 115 may use for transmission of the DMRS. For example, the resource block configuration 400-a may implement DMRS configuration Type 1, and the UE 115 may alternate the placement of DMRS tones and data tones over every other RE such that half of the bandwidth may be allocated for transmission of the DMRS. Resource block configuration 400-b may implement DMRS configuration Type 2, and the UE 115 may allocate the reference DMRS to consecutive frequency sub-carriers (e.g., sub-carrier index 0 and index 1) with four empty sub-carriers following after consecutive sub-carriers (e.g., sub-carrier indices 2-5).

To support efficient transmission of DMRS and data, the base station 105 may transmit a grant to the UE 115 which indicates an uplink transmission structure that the UE 115 may use for subsequent transmission of the DMRS and the data. For example, the base station 105 may indicate a resource block allocation which implements a "comb" structure (e.g., a frequency allocation) for resource block configurations 400-a and 400-b, such that resource element occupancy for both the DMRS and the data is aligned in frequency. In such cases, the DMRS and the data may be transmitted on the same frequency indices in accordance with the DMRS type, and may have the same transmission powers. Based on the comb structure for the resource block, the base station may schedule uplink transmissions for one or more other UEs on the frequency tones that are not occupied by the DMRS and the data, thus increasing throughput for devices in the wireless system.

In FIG. 4A, the UE 115 may implement a resource block configuration 400-a, which has DMRS placement in accordance with DMRS Type 1. For example, the DMRS may be located in alternating frequency indices (e.g., 0, 2, 4, 6, 8, 10, or 1, 3, 5, 7, 9, 11), and the data (e.g., PUSCH) may be aligned with the DMRS on the alternating frequency indices. In such cases, the DMRS and the data may be transmitted at the same power (e.g., full power) in accordance with the comb structure of the resource block configuration 400-a.

In FIG. 4B, the UE 115 may implement a resource block configuration 400-b, which has DMRS placement in accordance with DMRS Type 2. For example, the DMRS may be located in contiguous frequency indices (e.g., 0-1 and 6-7), and the data (e.g., PUSCH) may be aligned with the DMRS on the contiguous frequency indices. In such cases, the DMRS and the data may be transmitted at the same power (e.g., full power) in accordance with the comb structure of the resource block configuration 400-b.

In some cases, the UE 115 the resource block allocations 400-a and 400-b may be implemented using cyclic-prefix OFDM or DFT-s-OFDM waveforms to increase spectral efficiency for the transmission of the DMRS and the data.

Figure 5:
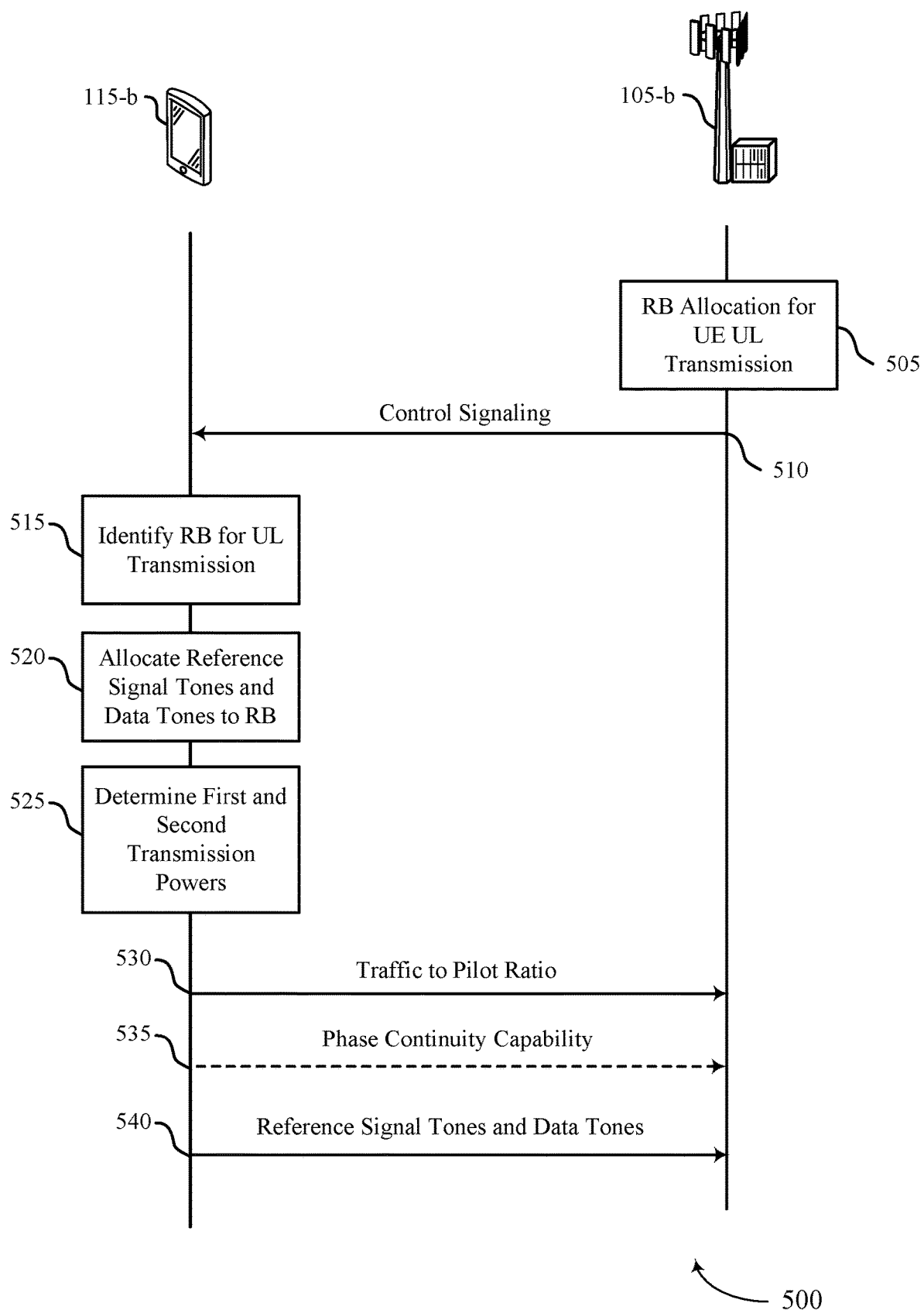
FIGS. 5 and 6 illustrate example process flows that support power scaling for DMRS and data transmission in accordance with aspects of the present disclosure.

FIG. 5 illustrates an example of a process flow 500 that supports power scaling for DMRS and data transmission in accordance with aspects of the present disclosure. For example, process flow 500 may include UE 115-b and base station 105-b, which may be respective examples of a UE 115 and a base station 105 as described with reference to FIGS. 1 and 2. In some cases, alternative examples of the following process flow may be implemented, where some steps are performed in a different order than described or are not performed at all. In some cases, steps may include additional features not mentioned below, or further steps may be added. In addition, while process flow 500 shows processes between a single base station and UE, it should be understood that these processes may occur between any number of network devices.

At 505, the base station 105-b may allocate a set of uplink resources to the UE 115-b via an uplink RB configuration that the UE 115-b may use to transmit DMRS and data to the base station 105-b. In some cases, the base station 105-b may allocate multiple resource blocks to the UE 115-b for subsequent uplink transmission of DMRS and data. In some examples, the resource block configuration may indicate a threshold power for transmission of the uplink resource block, a bandwidth available for transmission of the uplink resource block, a configuration type for the DMRS, or any combination thereof.

At 510, the base station 105-b may transmit control signaling which may include a resource block configuration for uplink transmissions of DMRS and data allocated to the UE 115-b. In some cases, the base station 105-b may transmit the control signaling to the UE 115-b over a physical downlink control channel (PDCCH), in an RRC message, a downlink control information (DCI) message, or other control signaling.

At 515, the UE 115-b may receive, from the base station 105-b, the control signaling which identifies the resource block configuration. In some examples, the resource block configuration may indicate a number of reference signal tones (e.g., DMRS tones) and a number of data tones (e.g., PUSCH data tones) allocated for transmission in an uplink resource block.

At 520, the UE 115-b may allocate the reference signal tones and the data tones to the multiple resource elements in the uplink resource block based on the resource block configuration. The resource block configuration may further include a threshold power for transmission of the uplink resource block, a bandwidth available for transmission of the uplink resource block, a configuration type for the plurality of reference signal tones, or any combination thereof. For example, in some cases, the UE 115-a may allocate the reference signal tones and the data tones based on a DMRS configuration type (e.g., DMRS configuration Type 1 or DMRS configuration Type 2) indicated by the resource block configuration.

At 525, the UE 115-b may determine a first transmission power for the number of reference signal tones and a second transmission power for the number of data tones based on the resource block configuration. In some examples, the first transmission power and the second transmission power may be different from one another.

In some examples, the UE 115-b may identify a set of transmission power values in accordance with the resource block configuration, a subcarrier spacing associated with the uplink resource block, or both. The UE 115-b may select the first transmission power for the reference signal tones and the second transmission power for the data tones based on the set of transmission power values.

In some examples, the UE 115-b may determine the first transmission power for the number of reference signal tones and the second transmission power for the number of data tones based on a transmission power ratio (e.g., a traffic to pilot ratio). In some cases, the transmission power ratio may be based on the resource block configuration received from the base station 105-b (e.g., the transmission power ratio may be dynamically allocated to the UE 115-b), or the UE 115-b may determine the transmission power ratio based on a look up table or based on other factors.

At 530, the UE 115-b may transmit an indication of the first transmission power for the number of reference signal tones being different from the second transmission power for the number of data tones. In some examples, this indication may be a ratio between the first transmission power and the second transmission power (e.g., a traffic to pilot ratio). For example, the UE 115-b may transmit a traffic to pilot ratio of 1:2, indicating that the UE 115-b may transmit the data tones at twice the transmission power relative to the reference signal tones. In some cases, the UE 115-b may transmit the indication of the traffic to pilot ratio via a report on a PUCCH, using an RRC message, a MAC-CE, or any combination thereof.

At 535, the UE 115-*b* may transmit an indication to the base station 105-*b* which indicates a capability of the UE 115-*b* to maintain a phase continuity between the transmissions of the reference signal tones using the first transmission power and data tones using the second transmission power. For example, in some cases, the UE 115-*b* may be unable to maintain phase continuity between the reference signal tones and data tones transmitted at different powers. In such a case, the UE 115-*b* may prioritize preserving phase continuity during uplink transmission rather than proceeding with an updated traffic to pilot ratio (e.g., in cases that the UE 115-*b* does not transmit phase tracking reference signals with the reference signal tones and data tones). However, in some other examples, the UE 115-*b* may be capable of maintaining phase continuity between the reference signal tones and data tones transmitted at different powers. In such examples, the UE 115-*b* may transmit the indication at 535 to indicate the capability. Additionally or alternatively, the UE 115-*b* may transmit the reference signal tones and the data tones with a number of phase tracking reference signal tones to correct for phase discontinuity.

At 540, the UE 115-*b* may transmit, to the base station 105-*b*, the reference signal tones and data tones to the base station 105-*b* using the indicated resource block configuration. The reference signal tones and data tones may be transmitted using the first transmission power and the second transmission power, respectively.

Figure 6:
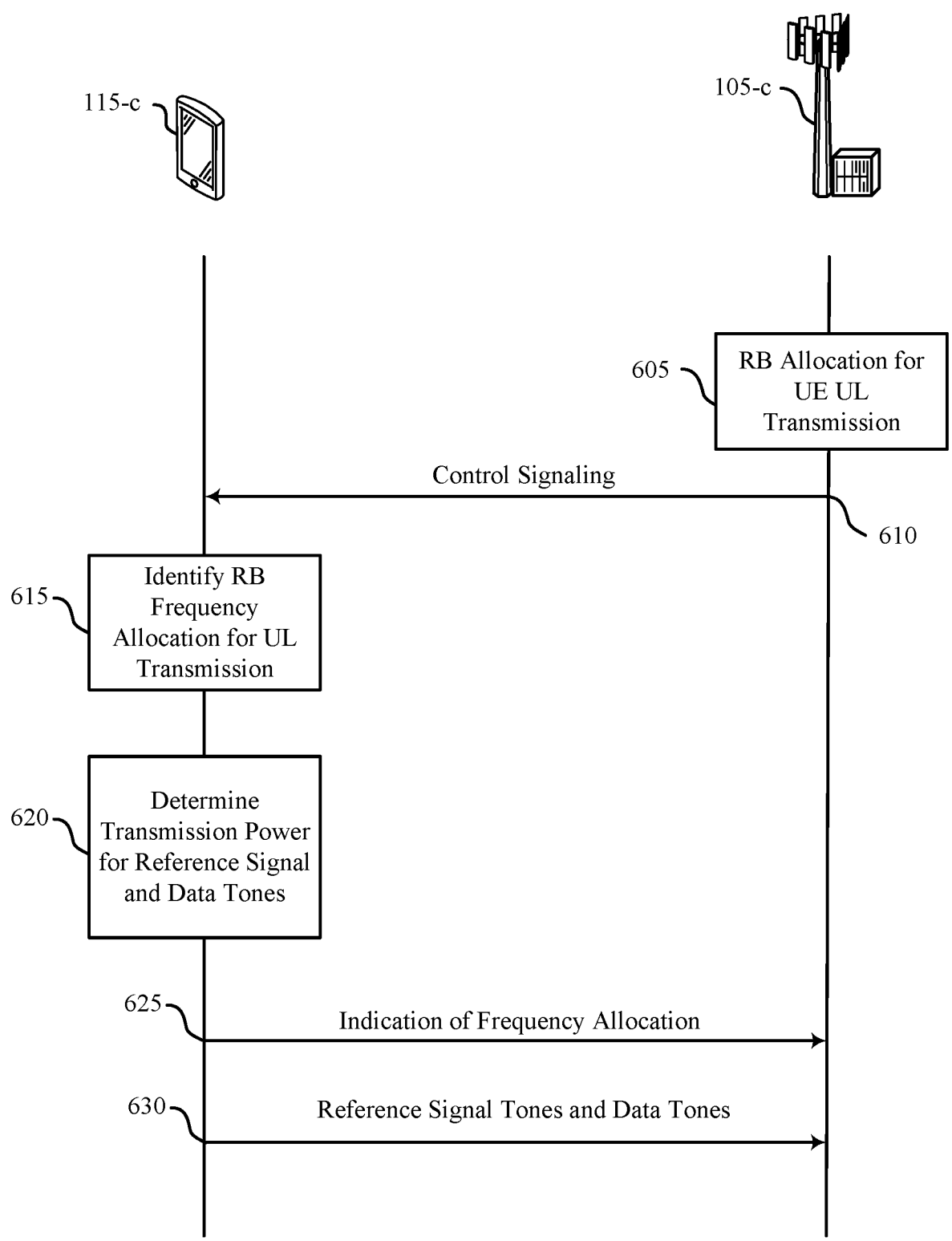

FIG. 6 illustrates an example of a process flow 600 that supports power scaling for DMRS and data transmission in accordance with aspects of the present disclosure. In some examples, process flow 600 may implement aspects of wireless communications systems 100 or 200, resource block configuration 400-*a*, resource block configuration 400-*b*, or any combination thereof. Process flow 600 includes UE 115-*c* and base station 105-*c*, which may be respective examples of a UE 115 and a base station 105 as described with reference to FIGS. 1 and 2. In some cases, alternative examples of the following may be implemented, where some steps are performed in a different order than described or are not performed at all. In some cases, steps may include additional features not mentioned below, or further steps may be added. In addition, while process flow 600 shows processes between a single base station 105-*c* and UE 115-*c*, it should be understood that these processes may occur between any number of network devices.

At 605, the base station 105-*c* may allocate a set of uplink resources to the UE 115-*c* via an uplink resource block configuration that the UE 115-*c* may use to transmit DMRS and data to the base station 105-*c*. In some cases, the base station 105-*c* may allocate multiple resource blocks to the UE 115-*c* for the uplink transmission of DMRS and data.

At 610, the base station 105-*c* may transmit control signaling which may identify one or more resource blocks allocated to the UE 115-*c* for uplink transmissions of DMRS and data. In some cases, the base station 105-*c* may transmit the control signaling to the UE 115-*c* over a PDCCH, in an RRC message, a downlink control information (DCI) message, or a combination thereof.

At 615, the UE 115-*c* may receive, from the base station 105-*c*, the control signaling which identifies the resource block configuration. In some examples, the control signaling may include a resource block configuration that indicates a number of reference signal tones (e.g., DMRS tones) and data tones (e.g., PUSCH data tones) allocated for transmission in the uplink resource block, and the UE 115-*c* may determine a transmission power for the reference signal tones and the data tones based on the resource block configuration. In some examples, the resource block configuration may further indicate a threshold power for transmission of the uplink resource block, a bandwidth available for transmission of the uplink resource block, a configuration type for the DMRS, or any combination thereof. In some cases, the resource block configuration may further indicate a frequency allocation for transmission of the reference signal tones and the data tones. The frequency allocation may be associated with a cyclic prefix (CP) orthogonal frequency division multiplexing (OFDM) configuration for the number of reference signal tones and the number of data tones.

At 620, the UE 115-*c* may determine a transmission power for the reference signal tones and for the data tones based on the resource block configuration, where a first frequency bandwidth of the reference signal tones is equal to a second frequency bandwidth of the data tones based on the frequency allocation received from the base station 105-*c*. The UE 115-*c* may allocate the reference signal tones and the data tones based on the frequency allocation and the determination of the transmission power. In some examples, the number of reference signal tones and the number of data tones may be located on frequency indices (e.g., 0 through 11) that are interlaced across the bandwidth associated with the transmission of the uplink resource block. For instance, the data tones may occupy the same frequency sub-carriers as the DMRS tones, as described with reference to FIGS. 4A and 4B.

In some cases, the number of reference signal tones and the number of data tones may be located on alternating frequency indices of the uplink resource block based on a configuration type for the number of reference signal tones. For example, if the resource block allocation is of DMRS configuration Type 1, the UE 115-*c* may allocate the reference signal tones to every other frequency sub-carrier based on the resource block allocation received from the base station 105-*c*. In some other examples, the number of reference signal tones and the number of data tones are located on a number of contiguous frequency indices of the uplink resource block based at least in part on a configuration type for the number of reference signal tones. For example, if the resource block allocation is of DMRS configuration Type 2, the UE 115-*c* may allocate the reference signal tones with a pattern of two reference signal tones allocated to consecutive frequency sub-carriers (e.g., sub-carrier index 0 and index 1) with four empty sub-carriers following after (e.g., sub-carrier indices 2-5).

At 625, the UE 115-*c* may transmit an indication of the frequency allocation for transmission of the number of reference signal tones and the number of data tones on one or more same frequency indices. In some cases, the UE 115-*c* may also transmit an indication of the transmission power of the reference signal tones and data tones to the base station 105-*c*. For example, if the UE 115-*c* allocates the reference signal tones and data tones to the same frequency sub-carriers (such that the reference signal tones and data tones have the same frequency bandwidth), the UE 115-*c* may transmit the reference signal tones and the data tones at the same transmission power to maintain phase continuity between the reference signal tones and data tones. Additionally or alternatively, the UE 115-*c* may transmit the reference signal tones and the data tones with a number of phase tracking reference signal tones to correct for phase discontinuity.

At 630, the UE 115-c may transmit the reference signal tones and data tones to the base station 105-c using the resource block or set of resource blocks based on the frequency allocation. The UE 115-c may transmit the reference signal tones and data tones using the transmission power indicated in the frequency allocation indication message. The base station 105-c may receive the multiple reference signal tones and data tones via the configured one or more resource blocks.

Figure 7:
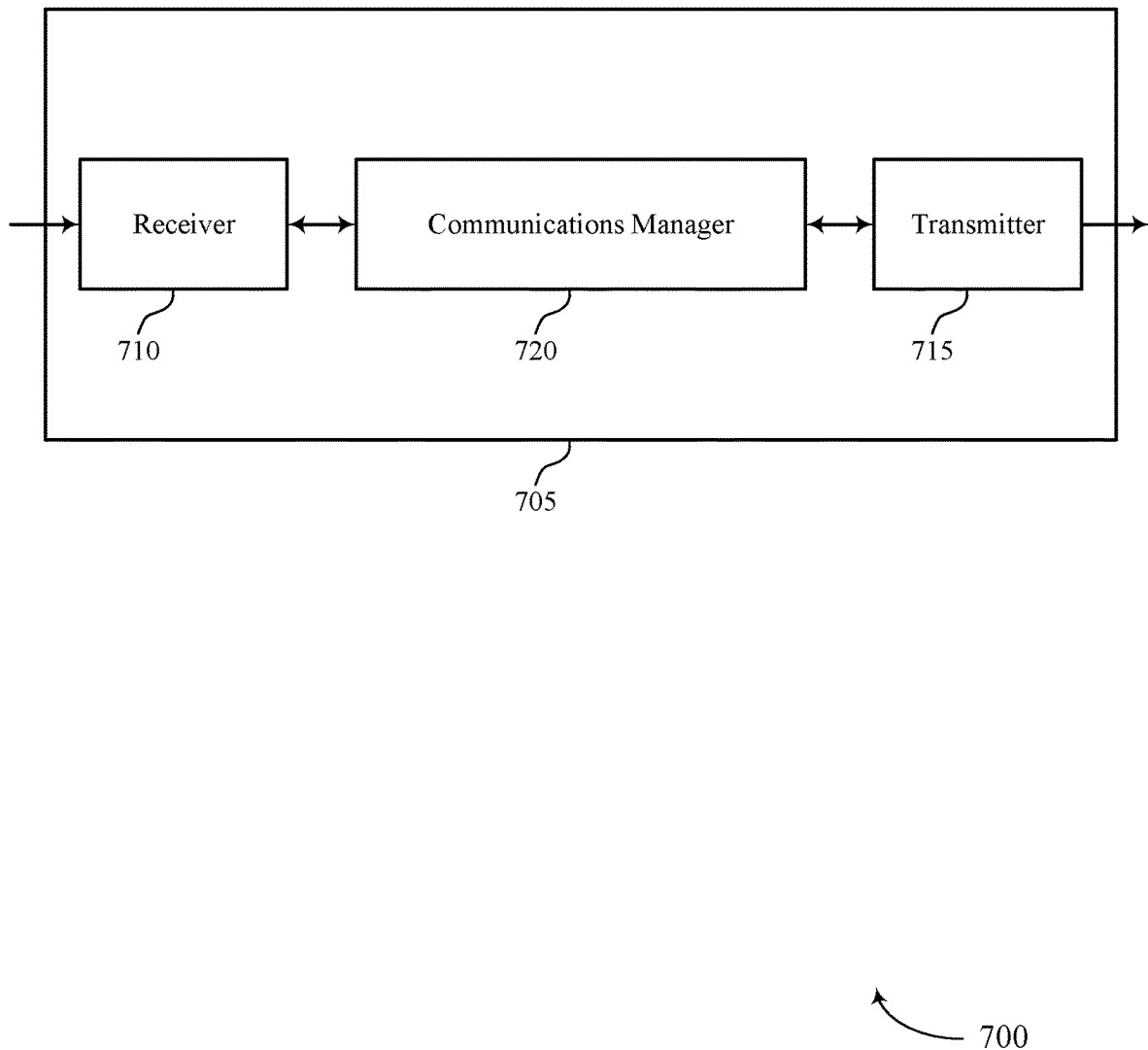
FIGS. 7 and 8 show block diagrams of devices that support power scaling for DMRS and data transmission in accordance with aspects of the present disclosure.

FIG. 7 shows a block diagram 700 of a device 705 that supports power scaling for DMRS and data transmission in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power scaling for DMRS and data transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power scaling for DMRS and data transmission). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of power scaling for DMRS and data transmission as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a base station, control signaling identifying a resource block configuration that indicates a set of multiple reference signal tones and a set of multiple data tones allocated for transmission in an uplink resource block. The communications manager 720 may be configured as or otherwise support a means for determining a first transmission power for the set of multiple reference signal tones and a second transmission power for the set of multiple data tones based on the resource block configuration, where the first transmission power is different from the second transmission power. The communications manager 720 may be configured as or otherwise support a means for transmitting, to the base station, the set of multiple reference signal tones using the first transmission power and the set of multiple data tones using the second transmission power.

Additionally or alternatively, the communications manager 720 may support wireless communications at a UE in accordance with examples as disclosed herein. For example, the communications manager 720 may be configured as or otherwise support a means for receiving, from a base station, control signaling identifying a resource block configuration that indicates a frequency allocation for transmission of a set of multiple reference signal tones and a set of multiple data tones in an uplink resource block. The communications manager 720 may be configured as or otherwise support a means for determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation. The communications manager 720 may be configured as or otherwise support a means for transmitting, to the base station, the set of multiple reference signal tones and the set of multiple data tones based on the frequency allocation using the determined transmission power.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for efficient power consumption, more efficient utilization of communication resources, and more effective allocation of reference signal tones and data tones to uplink transmissions.

Figure 8:
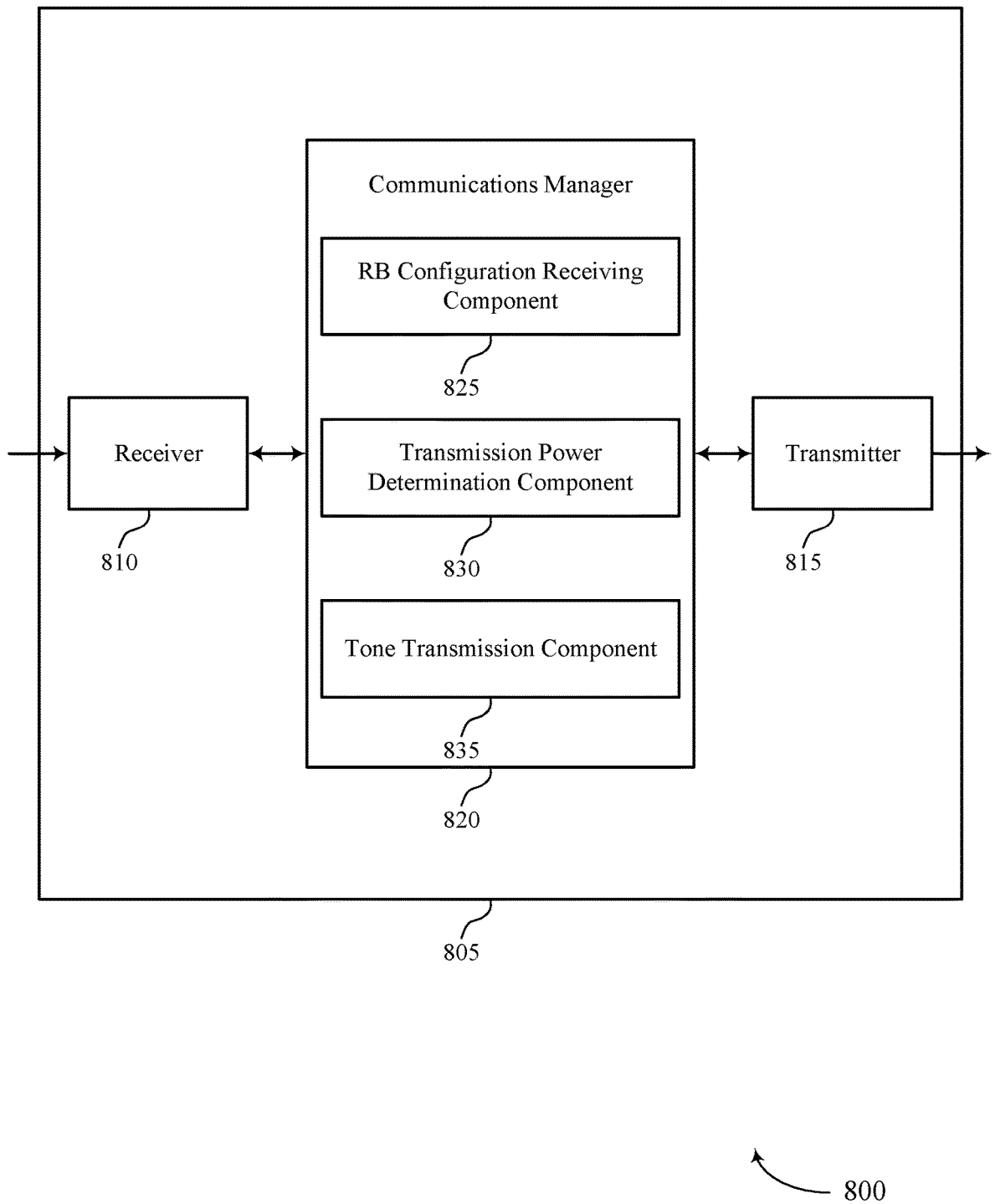

FIG. 8 shows a block diagram 800 of a device 805 that supports power scaling for DMRS and data transmission in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to power scaling for DMRS and data transmission). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to power scaling for DMRS and data transmission). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of power scaling for DMRS and data transmission as described herein. For example, the communications manager 820 may include an resource block configuration receiving component 825, a transmission power determination component 830, a tone transmission component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The resource block configuration receiving component 825 may be configured as or otherwise support a means for receiving, from a base station, control signaling identifying a resource block configuration that indicates a set of multiple reference signal tones and a set of multiple data tones allocated for transmission in an uplink resource block. The transmission power determination component 830 may be configured as or otherwise support a means for determining a first transmission power for the set of multiple reference signal tones and a second transmission power for the set of multiple data tones based on the resource block configuration, where the first transmission power is different from the second transmission power. The tone transmission component 835 may be configured as or otherwise support a means for transmitting, to the base station, the set of multiple reference signal tones using the first transmission power and the set of multiple data tones using the second transmission power.

Additionally or alternatively, the communications manager 820 may support wireless communications at a UE in accordance with examples as disclosed herein. The resource block configuration receiving component 825 may be configured as or otherwise support a means for receiving, from a base station, control signaling identifying a resource block configuration that indicates a frequency allocation for transmission of a set of multiple reference signal tones and a set of multiple data tones in an uplink resource block. The transmission power determination component 830 may be configured as or otherwise support a means for determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation. The tone transmission component 835 may be configured as or otherwise support a means for transmitting, to the base station, the set of multiple reference signal tones and the set of multiple data tones based on the frequency allocation using the determined transmission power.

Figure 9:
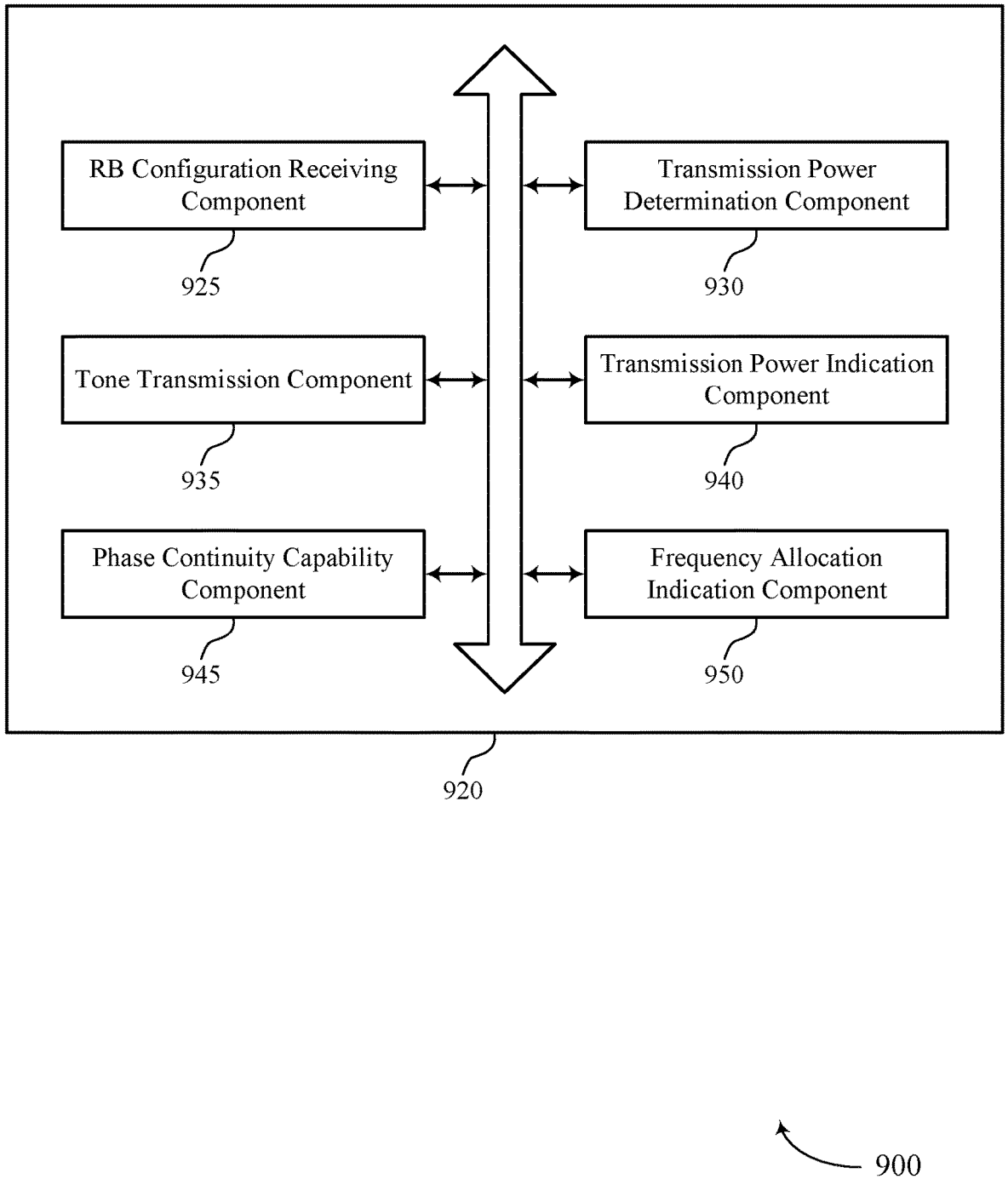
FIG. 9 shows a block diagram of a communications manager that supports power scaling for DMRS and data transmission in accordance with aspects of the present disclosure.

FIG. 9 shows a block diagram 900 of a communications manager 920 that supports power scaling for DMRS and data transmission in accordance with aspects of the present disclosure. The communications manager 920 may be an example of aspects of a communications manager 720, a communications manager 820, or both, as described herein. The communications manager 920, or various components thereof, may be an example of means for performing various aspects of power scaling for DMRS and data transmission as described herein. For example, the communications manager 920 may include an resource block configuration receiving component 925, a transmission power determination component 930, a tone transmission component 935, a transmission power indication component 940, a phase continuity capability component 945, a frequency allocation indication component 950, or any combination thereof. Each of these components may communicate, directly or indirectly, with one another (e.g., via one or more buses).

The communications manager 920 may support wireless communications at a UE in accordance with examples as disclosed herein. The resource block configuration receiving component 925 may be configured as or otherwise support a means for receiving, from a base station, control signaling identifying a resource block configuration that indicates a set of multiple reference signal tones and a set of multiple data tones allocated for transmission in an uplink resource block. The transmission power determination component 930 may be configured as or otherwise support a means for determining a first transmission power for the set of multiple reference signal tones and a second transmission power for the set of multiple data tones based on the resource block configuration, where the first transmission power is different from the second transmission power. The tone transmission component 935 may be configured as or otherwise support a means for transmitting, to the base station, the set of multiple reference signal tones using the first transmission power and the set of multiple data tones using the second transmission power.

In some examples, the transmission power indication component 940 may be configured as or otherwise support a means for transmitting, to the base station, an indication of the first transmission power for the set of multiple reference signal tones being different from the second transmission power for the set of multiple data tones.

In some examples, the indication includes a ratio between the first transmission power and the second transmission power.

In some examples, the transmission power indication component 940 may be configured as or otherwise support a means for transmitting the indication via an uplink control channel report, a radio resource control message, a medium access control-control element, or any combination thereof.

In some examples, the phase continuity capability component 945 may be configured as or otherwise support a means for transmitting, to the base station, a message indicating a capability of the UE to maintain a phase continuity between transmissions of the set of multiple reference signal tones using the first transmission power and transmissions of the set of multiple data tones using the second transmission power.

In some examples, the transmission power determination component 930 may be configured as or otherwise support a means for identifying a set of transmission power values in accordance with the resource block configuration, a subcarrier spacing of the uplink resource block, or both. In some examples, the transmission power determination component 930 may be configured as or otherwise support a means for selecting the first transmission power and the second transmission power from the set of transmission power values based on the identifying.

In some examples, the resource block configuration indicates a threshold power for transmission of the uplink resource block, a bandwidth available for transmission of the uplink resource block, a configuration type for the set of multiple reference signal tones, or any combination thereof.

In some examples, determining the first transmission power for the set of multiple reference signal tones and the second transmission power for the set of multiple data tones is based on a transmission power ratio.

In some examples, the transmission power ratio is based on the resource block configuration.

Additionally or alternatively, the communications manager 920 may support wireless communications at a UE in accordance with examples as disclosed herein. In some examples, the resource block configuration receiving component 925 may be configured as or otherwise support a means for receiving, from a base station, control signaling identifying a resource block configuration that indicates a frequency allocation for transmission of a set of multiple reference signal tones and a set of multiple data tones in an uplink resource block. In some examples, the transmission power determination component 930 may be configured as or otherwise support a means for determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation. In some examples, the tone transmission component 935 may be configured as or otherwise support a means for transmitting, to the base station, the set of multiple reference signal tones and the set of multiple data tones based on the frequency allocation using the determined transmission power.

In some examples, the frequency allocation indication component 950 may be configured as or otherwise support a means for transmitting, to the base station, an indication of the frequency allocation for transmission of the set of multiple reference signal tones and the set of multiple data tones on one or more same frequency indices.

In some examples, the set of multiple reference signal tones and the set of multiple data tones are located on frequency indices that are interlaced across a bandwidth associated with transmission of the uplink resource block.

In some examples, the set of multiple reference signal tones and the set of multiple data tones are located on alternating frequency indices of the uplink resource block based on a configuration type for the set of multiple reference signal tones.

In some examples, the set of multiple reference signal tones and the set of multiple data tones are located on a number of contiguous frequency indices of the uplink resource block based on a configuration type for the set of multiple reference signal tones.

In some examples, the resource block configuration indicates a threshold power for transmission of the uplink resource block, a bandwidth available for transmission of the uplink resource block, a configuration type for the set of multiple reference signal tones, or any combination thereof.

In some examples, the frequency allocation is associated with a cyclic prefix (CP) orthogonal frequency division multiplexing (OFDM) configuration for the set of multiple reference signal tones and the set of multiple data tones.

Figure 10:
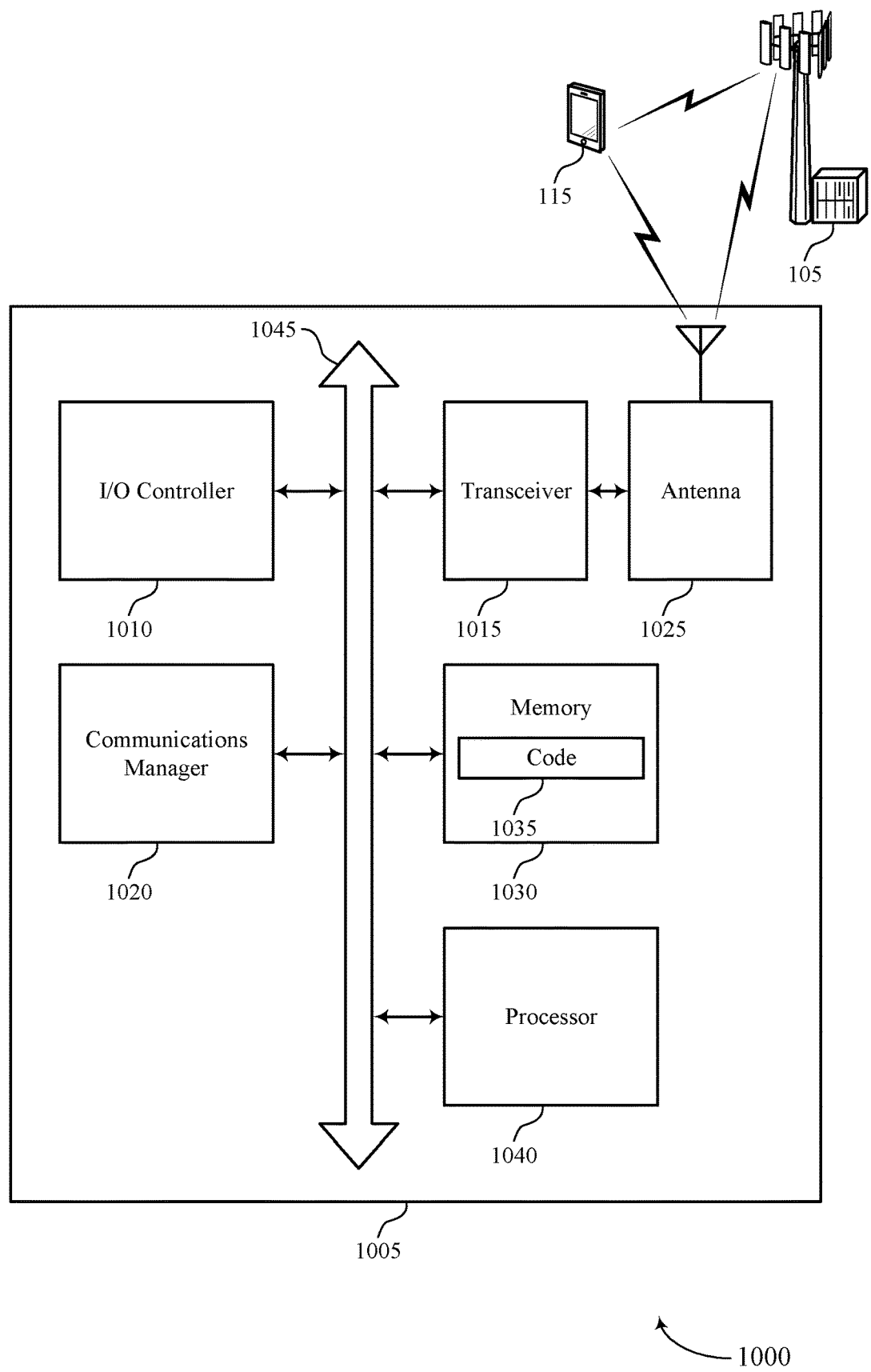
FIG. 10 shows a diagram of a system including a device that supports power scaling for DMRS and data transmission in accordance with aspects of the present disclosure.

FIG. 10 shows a diagram of a system 1000 including a device 1005 that supports power scaling for DMRS and data transmission in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power scaling for DMRS and data transmission). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a base station, control signaling identifying a resource block configuration that indicates a set of multiple reference signal tones and a set of multiple data tones allocated for transmission in an uplink resource block. The communications manager 1020 may be configured as or otherwise support a means for determining a first transmission power for the set of multiple reference signal tones and a second transmission power for the set of multiple data tones based on the resource block configuration, where the first transmission power is different from the second transmission power. The communications manager 1020 may be configured as or otherwise support a means for transmitting, to the base station, the set of multiple reference signal tones using the first transmission power and the set of multiple data tones using the second transmission power.

Additionally or alternatively, the communications manager 1020 may support wireless communications at a UE in accordance with examples as disclosed herein. For example, the communications manager 1020 may be configured as or otherwise support a means for receiving, from a base station, control signaling identifying a resource block configuration that indicates a frequency allocation for transmission of a set of multiple reference signal tones and a set of multiple data tones in an uplink resource block. The communications manager 1020 may be configured as or otherwise support a means for determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation. The communications manager 1020 may be configured as or otherwise support a means for transmitting, to the base station, the set of multiple reference signal tones and the set of multiple data tones based on the frequency allocation using the determined transmission power.

By including or configuring the communications manager 1020 in accordance with examples as described herein, the device 1005 may support techniques for improved communication reliability, improved user experience related to increased data throughput, more efficient utilization of communication resources, improved coordination between devices, increased data throughput, and increased uplink coverage.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of power scaling for DMRS and data transmission as described herein, or the processor 1040 and the memory 1030 may be otherwise configured to perform or support such operations.

Figure 11:
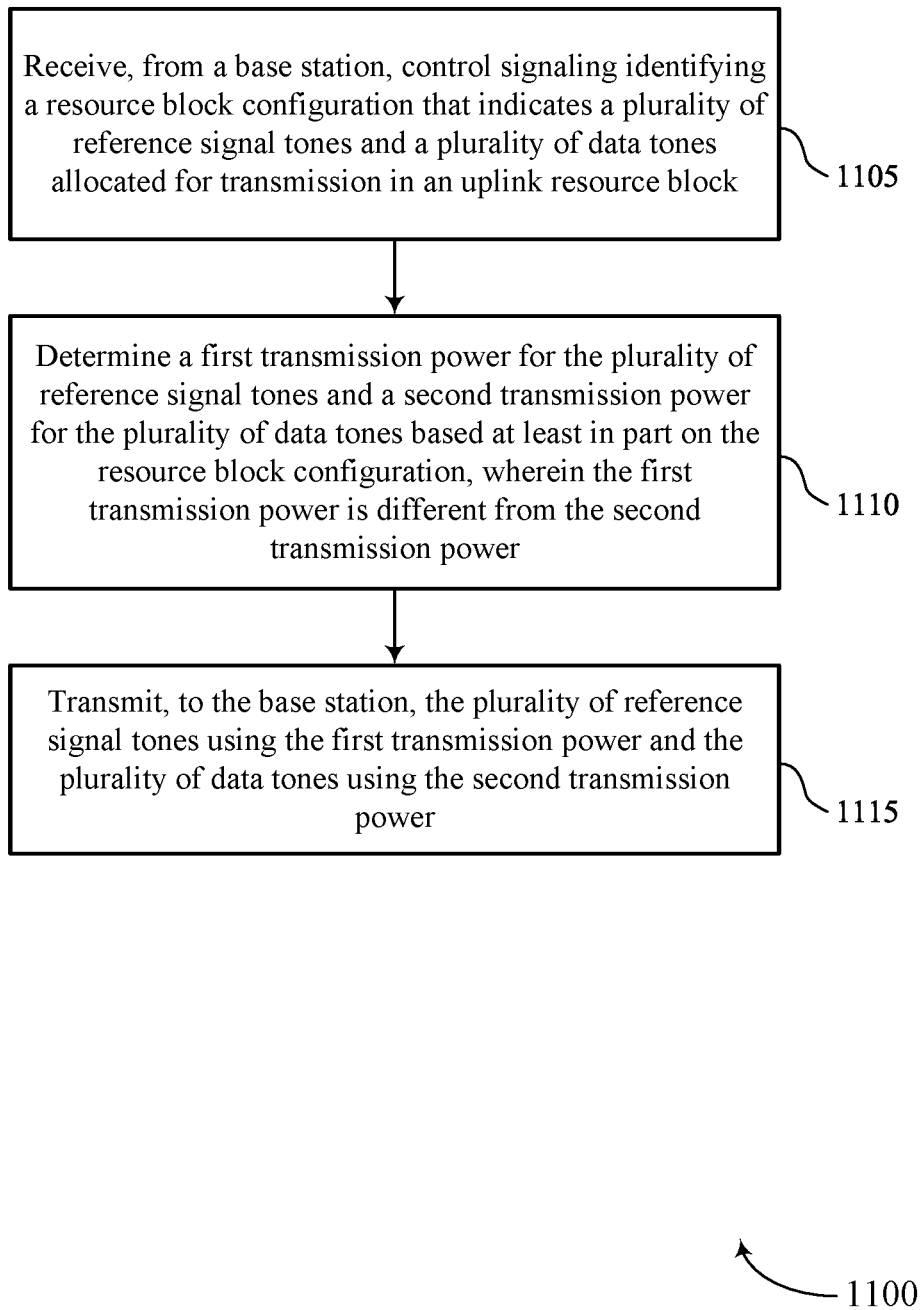
FIGS. 11 through 16 show flowcharts illustrating methods that support power scaling for DMRS and data transmission in accordance with aspects of the present disclosure.

FIG. 11 shows a flowchart illustrating a method 1100 that supports power scaling for DMRS and data transmission in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, control signaling identifying a resource block configuration that indicates a set of multiple reference signal tones and a set of multiple data tones allocated for transmission in an uplink resource block. The operations of 1105 may be performed in accordance with examples as disclosed herein. In some examples, aspects of the operations of 1105 may be performed by an resource block configuration receiving component 925 as described with reference to FIG. 9.

At 1110, the method may include determining a first transmission power for the set of multiple reference signal tones and a second transmission power for the set of multiple data tones based on the resource block configuration, where the first transmission power is different from the second transmission power. The operations of 1110 may be performed in accordance with examples as disclosed herein. In some examples, aspects of the operations of 1110 may be performed by a transmission power determination component 930 as described with reference to FIG. 9.

At 1115, the method may include transmitting, to the base station, the set of multiple reference signal tones using the first transmission power and the set of multiple data tones using the second transmission power. The operations of 1115 may be performed in accordance with examples as disclosed herein. In some examples, aspects of the operations of 1115 may be performed by a tone transmission component 935 as described with reference to FIG. 9.

Figure 12:
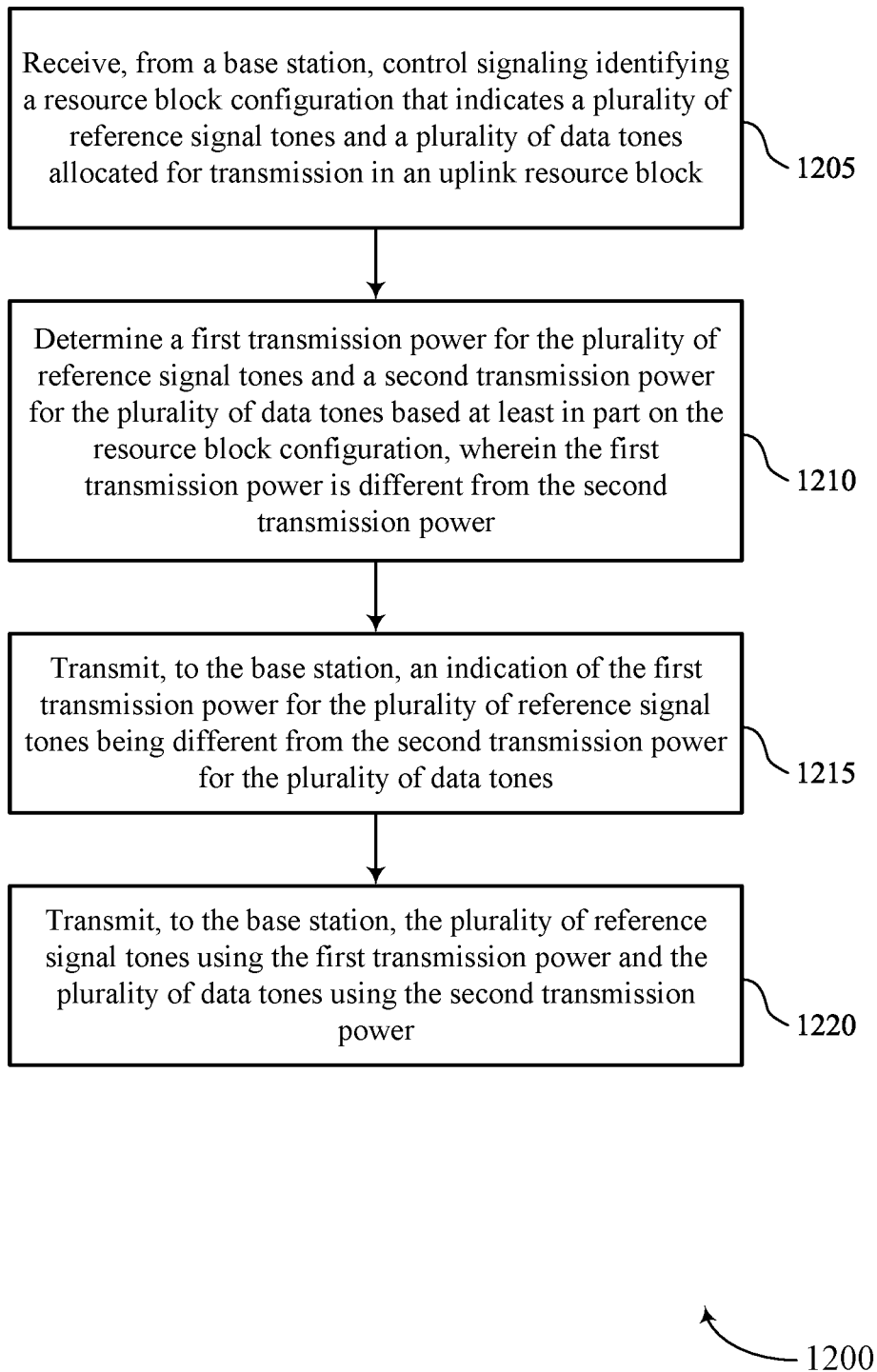

FIG. 12 shows a flowchart illustrating a method 1200 that supports power scaling for DMRS and data transmission in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, control signaling identifying a resource block configuration that indicates a set of multiple reference signal tones and a set of multiple data tones allocated for transmission in an uplink resource block. The operations of 1205 may be performed in accordance with examples as disclosed herein. In some examples, aspects of the operations of 1205 may be performed by an resource block configuration receiving component 925 as described with reference to FIG. 9.

At 1210, the method may include determining a first transmission power for the set of multiple reference signal tones and a second transmission power for the set of multiple data tones based on the resource block configuration, where the first transmission power is different from the second transmission power. The operations of 1210 may be performed in accordance with examples as disclosed herein. In some examples, aspects of the operations of 1210 may be performed by a transmission power determination component 930 as described with reference to FIG. 9.

At 1215, the method may include transmitting, to the base station, an indication of the first transmission power for the set of multiple reference signal tones being different from the second transmission power for the set of multiple data tones. The operations of 1215 may be performed in accordance with examples as disclosed herein. In some examples, aspects of the operations of 1215 may be performed by a transmission power indication component 940 as described with reference to FIG. 9.

At 1220, the method may include transmitting, to the base station, the set of multiple reference signal tones using the first transmission power and the set of multiple data tones using the second transmission power. The operations of 1220 may be performed in accordance with examples as disclosed herein. In some examples, aspects of the operations of 1220 may be performed by a tone transmission component 935 as described with reference to FIG. 9.

Figure 13:
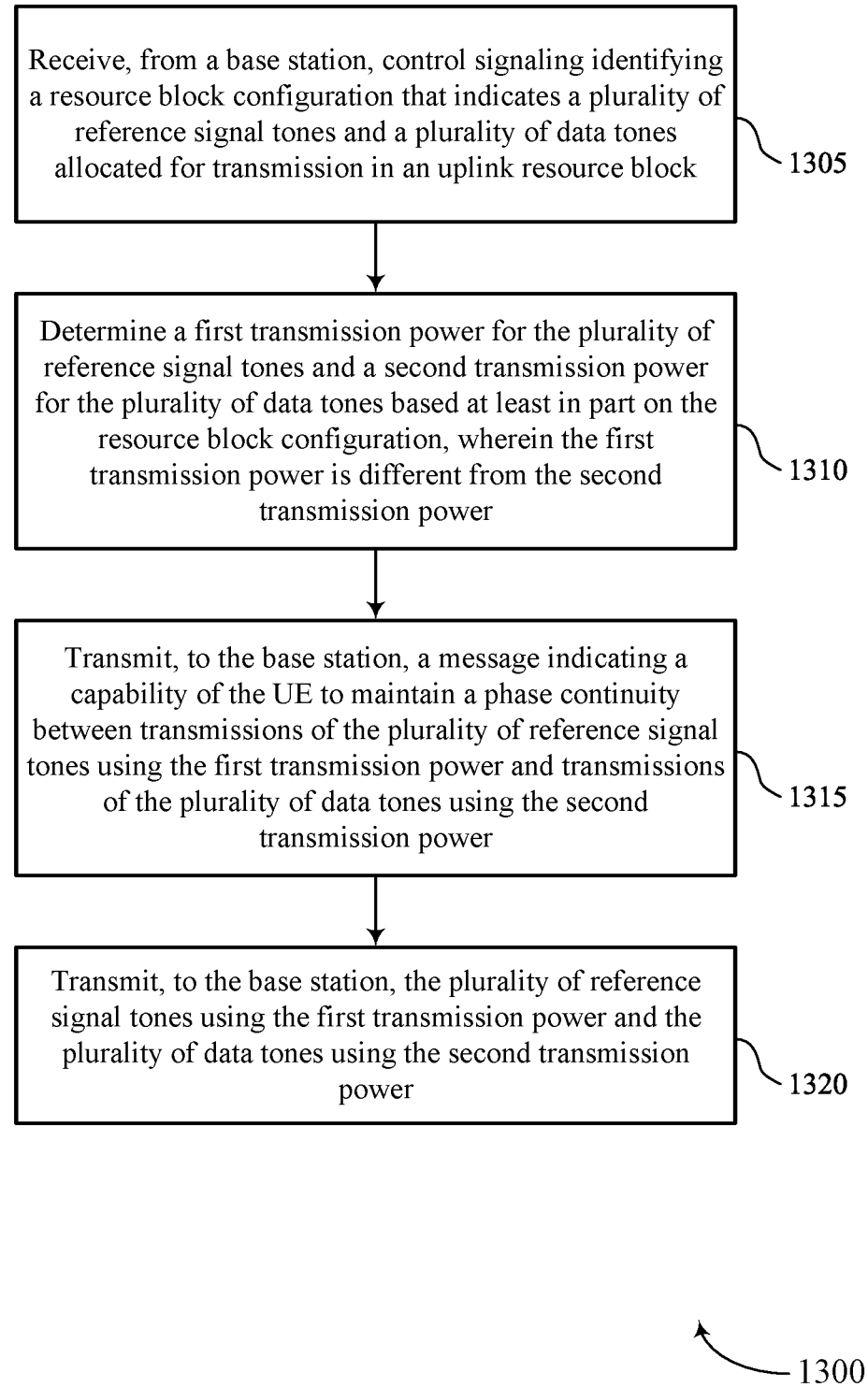

FIG. 13 shows a flowchart illustrating a method 1300 that supports power scaling for DMRS and data transmission in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling identifying a resource block configuration that indicates a set of multiple reference signal tones and a set of multiple data tones allocated for transmission in an uplink resource block. The operations of 1305 may be performed in accordance with examples as disclosed herein. In some examples, aspects of the operations of 1305 may be performed by an resource block configuration receiving component 925 as described with reference to FIG. 9.

At 1310, the method may include determining a first transmission power for the set of multiple reference signal tones and a second transmission power for the set of multiple data tones based on the resource block configuration, where the first transmission power is different from the second transmission power. The operations of 1310 may be performed in accordance with examples as disclosed herein. In some examples, aspects of the operations of 1310 may be performed by a transmission power determination component 930 as described with reference to FIG. 9.

At 1315, the method may include transmitting, to the base station, a message indicating a capability of the UE to maintain a phase continuity between transmissions of the set of multiple reference signal tones using the first transmission power and transmissions of the set of multiple data tones using the second transmission power. The operations of 1315 may be performed in accordance with examples as disclosed herein. In some examples, aspects of the operations of 1315 may be performed by a phase continuity capability component 945 as described with reference to FIG. 9.

At 1320, the method may include transmitting, to the base station, the set of multiple reference signal tones using the first transmission power and the set of multiple data tones using the second transmission power. The operations of 1320 may be performed in accordance with examples as disclosed herein. In some examples, aspects of the operations of 1320 may be performed by a tone transmission component 935 as described with reference to FIG. 9.

Figure 14:
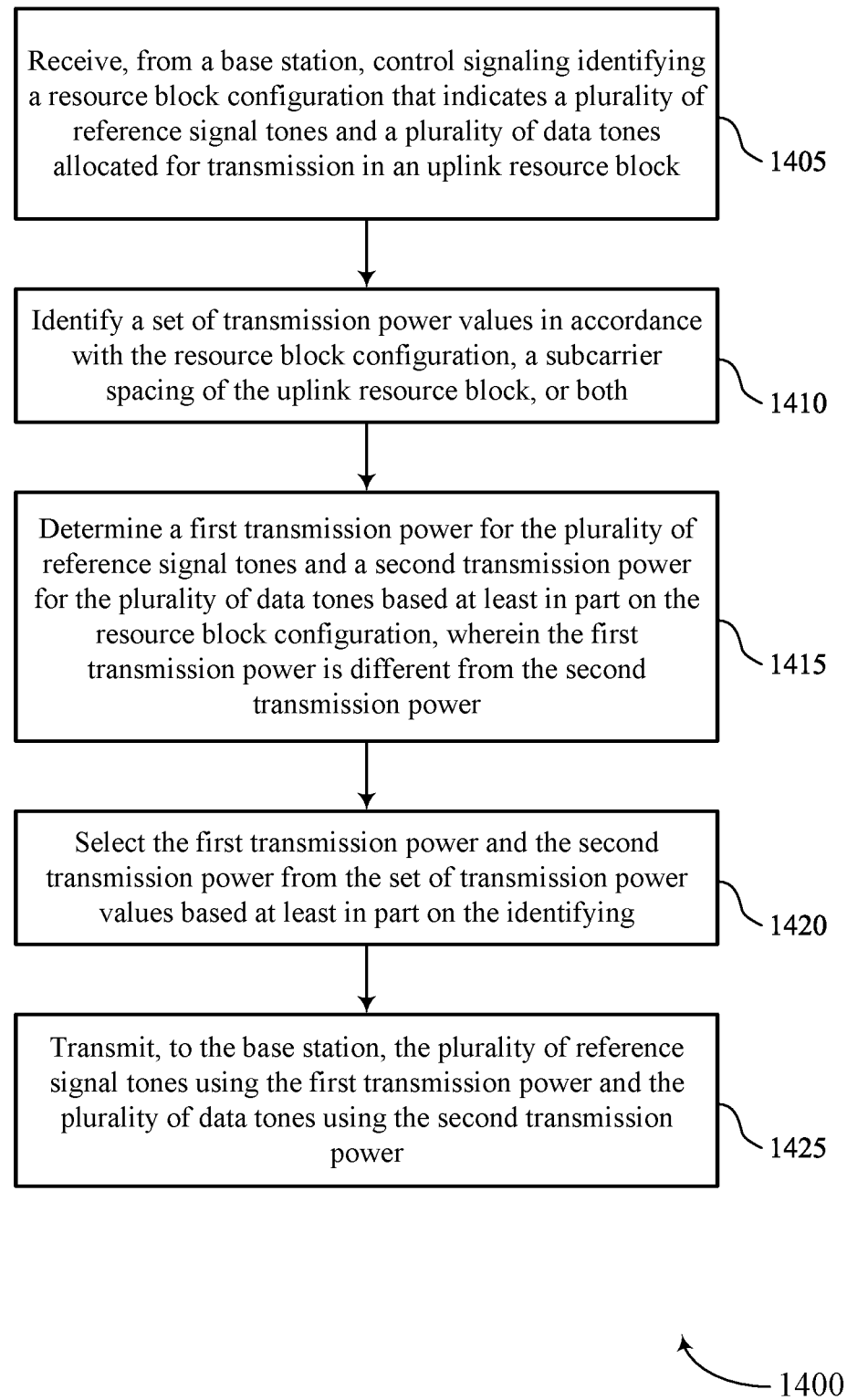

FIG. 14 shows a flowchart illustrating a method 1400 that supports power scaling for DMRS and data transmission in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling identifying a resource block configuration that indicates a set of multiple reference signal tones and a set of multiple data tones allocated for transmission in an uplink resource block. The operations of 1405 may be performed in accordance with examples as disclosed herein. In some examples, aspects of the operations of 1405 may be performed by an resource block configuration receiving component 925 as described with reference to FIG. 9.

At 1410, the method may include identifying a set of transmission power values in accordance with the resource block configuration, a subcarrier spacing of the uplink resource block, or both. The operations of 1410 may be performed in accordance with examples as disclosed herein. In some examples, aspects of the operations of 1410 may be performed by a transmission power determination component 930 as described with reference to FIG. 9.

At 1415, the method may include determining a first transmission power for the set of multiple reference signal tones and a second transmission power for the set of multiple data tones based on the resource block configuration, where the first transmission power is different from the second transmission power. The operations of 1415 may be performed in accordance with examples as disclosed herein. In some examples, aspects of the operations of 1415 may be performed by a transmission power determination component 930 as described with reference to FIG. 9.

At 1420, the method may include selecting the first transmission power and the second transmission power from the set of transmission power values based on the identifying. The operations of 1420 may be performed in accordance with examples as disclosed herein. In some examples, aspects of the operations of 1420 may be performed by a transmission power determination component 930 as described with reference to FIG. 9.

At 1425, the method may include transmitting, to the base station, the set of multiple reference signal tones using the first transmission power and the set of multiple data tones using the second transmission power. The operations of 1425 may be performed in accordance with examples as disclosed herein. In some examples, aspects of the operations of 1425 may be performed by a tone transmission component 935 as described with reference to FIG. 9.

Figure 15:
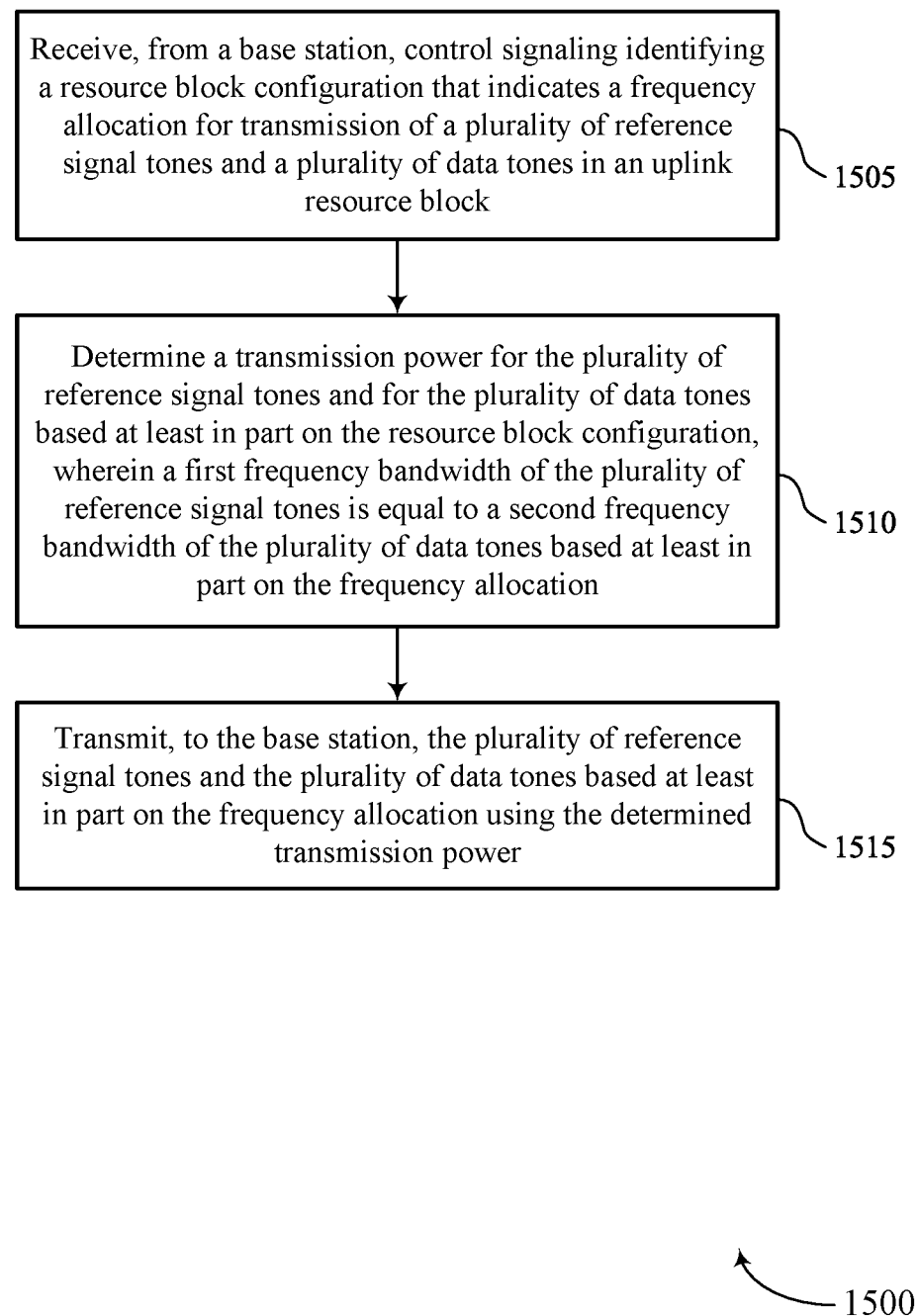

FIG. 15 shows a flowchart illustrating a method 1500 that supports power scaling for DMRS and data transmission in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling identifying a resource block configuration that indicates a frequency allocation for transmission of a set of multiple reference signal tones and a set of multiple data tones in an uplink resource block. The operations of 1505 may be performed in accordance with examples as disclosed herein. In some examples, aspects of the operations of 1505 may be performed by an resource block configuration receiving component 925 as described with reference to FIG. 9.

At 1510, the method may include determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation. The operations of 1510 may be performed in accordance with examples as disclosed herein. In some examples, aspects of the operations of 1510 may be performed by a transmission power determination component 930 as described with reference to FIG. 9.

At 1515, the method may include transmitting, to the base station, the set of multiple reference signal tones and the set of multiple data tones based on the frequency allocation using the determined transmission power. The operations of 1515 may be performed in accordance with examples as disclosed herein. In some examples, aspects of the operations of 1515 may be performed by a tone transmission component 935 as described with reference to FIG. 9.

Figure 16:
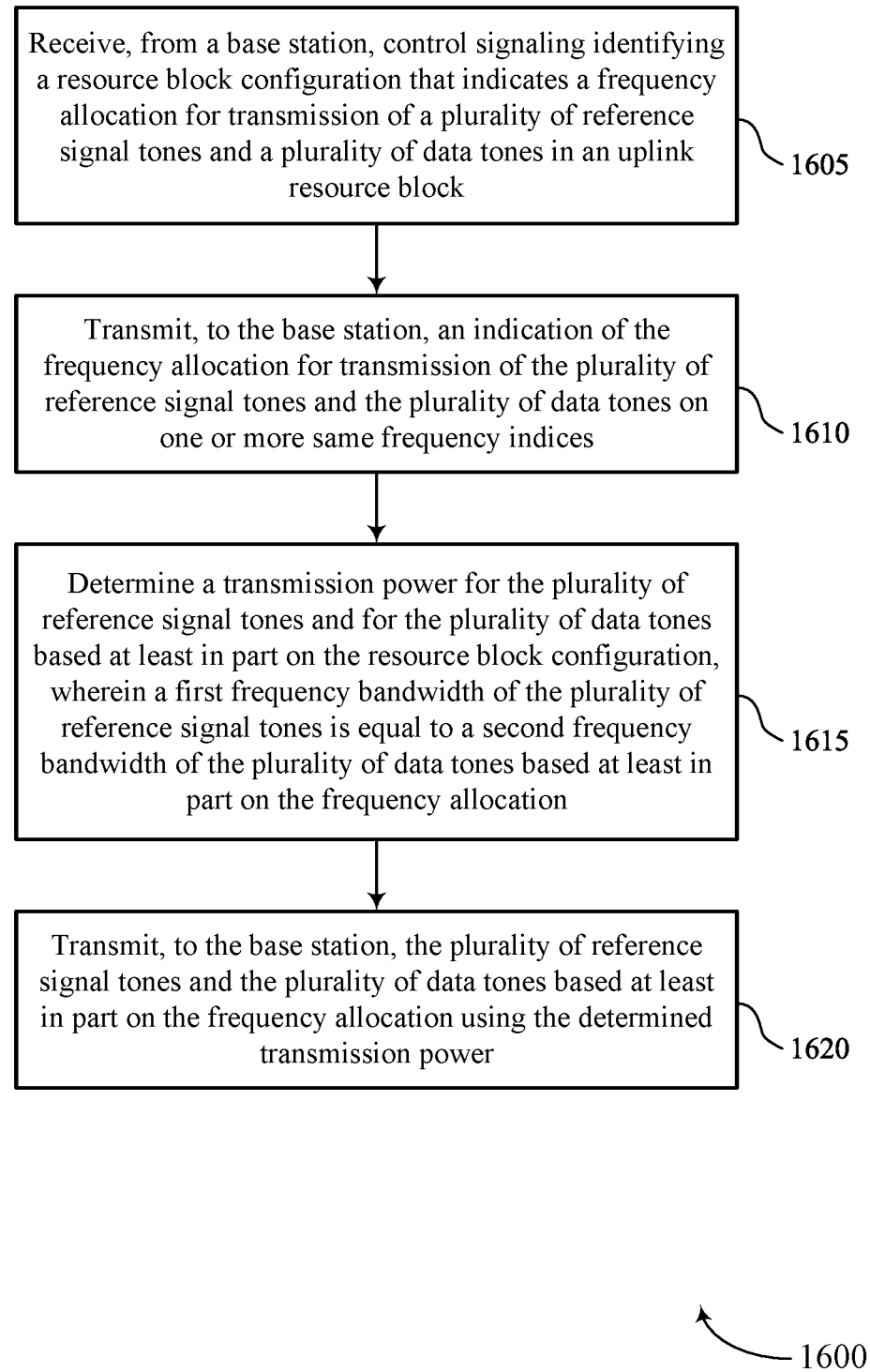

FIG. 16 shows a flowchart illustrating a method 1600 that supports power scaling for DMRS and data transmission in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling identifying a resource block configuration that indicates a frequency allocation for transmission of a set of multiple reference signal tones and a set of multiple data tones in an uplink resource block. The operations of 1605 may be performed in accordance with examples as disclosed herein. In some examples, aspects of the operations of 1605 may be performed by an resource block configuration receiving component 925 as described with reference to FIG. 9.

At 1610, the method may include transmitting, to the base station, an indication of the frequency allocation for transmission of the set of multiple reference signal tones and the set of multiple data tones on one or more same frequency indices. The operations of 1610 may be performed in accordance with examples as disclosed herein. In some examples, aspects of the operations of 1610 may be performed by a frequency allocation indication component 950 as described with reference to FIG. 9.

At 1615, the method may include determining a transmission power for the set of multiple reference signal tones and for the set of multiple data tones based on the resource block configuration, where a first frequency bandwidth of the set of multiple reference signal tones is equal to a second frequency bandwidth of the set of multiple data tones based on the frequency allocation. The operations of 1615 may be performed in accordance with examples as disclosed herein. In some examples, aspects of the operations of 1615 may be performed by a transmission power determination component 930 as described with reference to FIG. 9.

At 1620, the method may include transmitting, to the base station, the set of multiple reference signal tones and the set of multiple data tones based on the frequency allocation using the determined transmission power. The operations of 1620 may be performed in accordance with examples as disclosed herein. In some examples, aspects of the operations of 1620 may be performed by a tone transmission component 935 as described with reference to FIG. 9.

The following provides an overview of aspects of the present disclosure:

Aspect 1: A method for wireless communications at a UE, comprising: receiving, from a base station, control signaling identifying a resource block configuration that indicates a plurality of reference signal tones and a plurality of data tones allocated for transmission in an uplink resource block; determining a first transmission power for the plurality of reference signal tones and a second transmission power for the plurality of data tones based at least in part on the resource block configuration, wherein the first transmission power is different from the second transmission power; and transmitting, to the base station, the plurality of reference signal tones using the first transmission power and the plurality of data tones using the second transmission power.

Aspect 2: The method of aspect 1, further comprising: transmitting, to the base station, an indication of the first transmission power for the plurality of reference signal tones being different from the second transmission power for the plurality of data tones.

Aspect 3: The method of aspect 2, wherein the indication comprises a ratio between the first transmission power and the second transmission power.

Aspect 4: The method of any of aspects 2 through 3, further comprising: transmitting the indication via an uplink control channel report, a radio resource control message, a medium access control-control element, or any combination thereof.

Aspect 5: The method of any of aspects 1 through 4, further comprising: transmitting, to the base station, a message indicating a capability of the UE to maintain a phase continuity between transmissions of the plurality of reference signal tones using the first transmission power and transmissions of the plurality of data tones using the second transmission power.

Aspect 6: The method of any of aspects 1 through 5, further comprising: identifying a set of transmission power values in accordance with the resource block configuration, a subcarrier spacing of the uplink resource block, or both; and selecting the first transmission power and the second transmission power from the set of transmission power values based at least in part on the identifying.

Aspect 7: The method of any of aspects 1 through 6, wherein the resource block configuration indicates a threshold power for transmission of the uplink resource block, a bandwidth available for transmission of the uplink resource block, a configuration type for the plurality of reference signal tones, or any combination thereof.

Aspect 8: The method of any of aspects 1 through 7, wherein determining the first transmission power for the plurality of reference signal tones and the second transmission power for the plurality of data tones is based at least in part on a transmission power ratio.

Aspect 9: The method of aspect 8, wherein the transmission power ratio is based at least in part on the resource block configuration.

Aspect 10: A method for wireless communications at a UE, comprising: receiving, from a base station, control signaling identifying a resource block configuration that indicates a frequency allocation for transmission of a plurality of reference signal tones and a plurality of data tones in an uplink resource block; determining a transmission power for the plurality of reference signal tones and for the plurality of data tones based at least in part on the resource block configuration, wherein a first frequency bandwidth of the plurality of reference signal tones is equal to a second frequency bandwidth of the plurality of data tones based at least in part on the frequency allocation; and transmitting, to the base station, the plurality of reference signal tones and the plurality of data tones based at least in part on the frequency allocation using the determined transmission power.

Aspect 11: The method of aspect 10, further comprising: transmitting, to the base station, an indication of the frequency allocation for transmission of the plurality of reference signal tones and the plurality of data tones on one or more same frequency indices.

Aspect 12: The method of any of aspects 10 through 11, wherein the plurality of reference signal tones and the plurality of data tones are located on frequency indices that are interlaced across a bandwidth associated with transmission of the uplink resource block.

Aspect 13: The method of aspect 12, wherein the plurality of reference signal tones and the plurality of data tones are located on alternating frequency indices of the uplink resource block based at least in part on a configuration type for the plurality of reference signal tones.

Aspect 14: The method of any of aspects 12 through 13, wherein the plurality of reference signal tones and the plurality of data tones are located on a number of contiguous frequency indices of the uplink resource block based at least in part on a configuration type for the plurality of reference signal tones.

Aspect 15: The method of any of aspects 10 through 14, wherein the resource block configuration indicates a threshold power for transmission of the uplink resource block, a bandwidth available for transmission of the uplink resource block, a configuration type for the plurality of reference signal tones, or any combination thereof.

Aspect 16: The method of any of aspects 10 through 15, wherein the frequency allocation is associated with a cyclic prefix (CP) orthogonal frequency division multiplexing (OFDM) configuration for the plurality of reference signal tones and the plurality of data tones.

Aspect 17: An apparatus for wireless communications at a UE, comprising a processor; memory coupled with the processor; and instructions stored in the memory and executable by the processor to cause the apparatus to perform a method of any of aspects 1 through 9.

Aspect 18: An apparatus for wireless communications at a UE, comprising at least one means for performing a method of any of aspects 1 through 9.

Aspect 19: A non-transitory computer-readable medium storing code for wireless communications at a UE, the code comprising instructions executable by a processor to perform a method of any of aspects 1 through 9.

Aspect 20: An apparatus for wireless communications at a UE, comprising a processor; memory coupled with the processor; and instructions stored in the memory and executable by the processor to cause the apparatus to perform a method of any of aspects 10 through 16.

Aspect 21: An apparatus for wireless communications at a UE, comprising at least one means for performing a method of any of aspects 10 through 16.

Aspect 22: A non-transitory computer-readable medium storing code for wireless communications at a UE, the code comprising instructions executable by a processor to perform a method of any of aspects 10 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling identifying a resource block configuration that indicates a plurality of reference signal tones and a plurality of data tones allocated for transmission in an uplink resource block; and
   transmitting, based at least in part on the resource block configuration, the plurality of reference signal tones in accordance with a first phase and a first transmission power, and the plurality of data tones in accordance with a second phase and a second transmission power, wherein the first transmission power is different from the second transmission power and the first phase is equal to the second phase.

2. The method of claim 1, further comprising:
transmitting an indication of the first transmission power for the plurality of reference signal tones being different from the second transmission power for the plurality of data tones.

3. The method of claim 2, wherein the indication comprises a ratio between the first transmission power and the second transmission power.

4. The method of claim 2, further comprising:
transmitting the indication via an uplink control channel report, a radio resource control message, a medium access control-control element, or any combination thereof.

5. The method of claim 1, further comprising:
transmitting a message indicating a capability of the UE to maintain a phase continuity between transmissions of the plurality of reference signal tones using the first transmission power and transmissions of the plurality of data tones using the second transmission power.

6. The method of claim 1, further comprising:
identifying a set of transmission power values in accordance with the resource block configuration, a subcarrier spacing of the uplink resource block, or both; and
selecting the first transmission power and the second transmission power from the set of transmission power values based at least in part on the identifying.

7. The method of claim 1, wherein the resource block configuration indicates a threshold power for transmission of the uplink resource block, a bandwidth available for transmission of the uplink resource block, a configuration type for the plurality of reference signal tones, or any combination thereof.

8. The method of claim 1, further comprising:
determining the first transmission power for the plurality of reference signal tones and the second transmission power for the plurality of data tones based at least in part on a transmission power ratio.

9. The method of claim 8, wherein the transmission power ratio is based at least in part on the resource block configuration.

10. An apparatus for wireless communications at a user equipment (UE), comprising:
a processor;
memory coupled with the processor; and
instructions stored in the memory and executable by the processor to cause the apparatus to:
receive control signaling identifying a resource block configuration that indicates a plurality of reference signal tones and a plurality of data tones allocated for transmission in an uplink resource block; and
transmit, based at least in part on the resource block configuration, the plurality of reference signal tones in accordance with a first phase and a first transmission power, and the plurality of data tones in accordance with a second phase and a second transmission power, wherein the first transmission power is different from the second transmission power and the first phase is equal to the second phase.

11. The apparatus of claim 10, wherein the instructions are further executable by the processor to cause the apparatus to:
transmit an indication of the first transmission power for the plurality of reference signal tones being different from the second transmission power for the plurality of data tones.

12. The apparatus of claim 11, wherein the indication comprises a ratio between the first transmission power and the second transmission power.

13. The apparatus of claim 11, wherein the instructions are further executable by the processor to cause the apparatus to:
transmit the indication via an uplink control channel report, a radio resource control message, a medium access control-control element, or any combination thereof.

14. The apparatus of claim 10, wherein the instructions are further executable by the processor to cause the apparatus to:
transmit a message indicating a capability of the UE to maintain a phase continuity between transmissions of the plurality of reference signal tones using the first transmission power and transmissions of the plurality of data tones using the second transmission power.

15. The apparatus of claim 10, wherein the instructions are further executable by the processor to cause the apparatus to:
identify a set of transmission power values in accordance with the resource block configuration, a subcarrier spacing of the uplink resource block, or both; and
select the first transmission power and the second transmission power from the set of transmission power values based at least in part on the identifying.

16. The apparatus of claim 10, wherein the resource block configuration indicates a threshold power for transmission of the uplink resource block, a bandwidth available for transmission of the uplink resource block, a configuration type for the plurality of reference signal tones, or any combination thereof.

17. The apparatus of claim 10, wherein the instructions are further executable by the processor to cause the apparatus to:
determine the first transmission power for the plurality of reference signal tones and the second transmission power for the plurality of data tones is based at least in part on a transmission power ratio.

* * * * *